United States Patent
Nammi et al.

(10) Patent No.: US 10,498,405 B2
(45) Date of Patent: Dec. 3, 2019

(54) CODEBOOK RESTRICTION

(71) Applicant: Telefonaktiebolaget L M Ericsson (publ), Stockholm (SE)

(72) Inventors: Sairamesh Nammi, Kista (SE); Niklas Andgart, Södra Sandby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/526,722

(22) Filed: Oct. 29, 2014

(65) Prior Publication Data

US 2016/0127018 A1    May 5, 2016

(51) Int. Cl.
*H04B 7/0417* (2017.01)
*H04B 7/0456* (2017.01)
*H04B 7/06* (2006.01)

(52) U.S. Cl.
CPC ......... *H04B 7/0417* (2013.01); *H04B 7/0473* (2013.01); *H04B 7/0482* (2013.01); *H04B 7/063* (2013.01); *H04B 7/0486* (2013.01)

(58) Field of Classification Search
CPC .. H04B 7/0417; H04B 7/0473; H04B 7/0482; H04B 7/0486; H04B 7/063
(Continued)

(56) References Cited

U.S. PATENT DOCUMENTS 8,149,942 B1    4/2012  Wang et al.
8,699,589 B2    4/2014  Jia et al.
(Continued)

FOREIGN PATENT DOCUMENTS

EP    2437408 A1    4/2012
EP    2683092 A1    1/2014
(Continued)

OTHER PUBLICATIONS

Author Unknown, "Technical Specification Group Radio Access Network; Evolved Universal Terrestrial Radio Access (E-UTRA); User Equipment (UE) radio transmission and reception (Release 8)," Technical Specification 36.101, Version 8.0.0, 3GPP Organizational Partners, Dec. 2007, 45 pages.
(Continued)

*Primary Examiner* — Wednel Cadeau
(74) *Attorney, Agent, or Firm* — Withrow & Terranova, PLLC

(57) ABSTRACT

Systems and methods for codebook restriction for closed-loop codebook-based precoding in a Multiple-Input-Multiple-Output (MIMO) wireless communications system based on antenna correlation are disclosed. In some embodiments, a method of operation of a wireless device to provide feedback for a closed-loop codebook-based precoding system is provided. The method comprises determining a codebook restriction based on an antenna correlation for a MIMO channel between a network node and the wireless device. The antenna correlation is transmit antenna correlation, receive antenna correlation, or both transmit and receive antenna correlation. The codebook restriction is a restriction that reduces a full codebook of the wireless device to a reduced codebook. The method of operation of the wireless device further comprises generating a feedback report using the reduced codebook and transmitting the feedback report to the network node. By generating the feedback report using the reduced codebook, complexity is substantially reduced.

37 Claims, 15 Drawing Sheets

(58) Field of Classification Search
USPC ........ 375/346, 349, 347, 267, 296; 455/101, 455/132, 562.1, 525; 370/203, 252
See application file for complete search history.

(56) References Cited

U.S. PATENT DOCUMENTS

| | | | |
|---|---|---|---|
| 9,136,924 B2 | 9/2015 | Park | |
| 9,602,181 B2 | 3/2017 | Nammi et al. | |
| 2009/0213945 A1* | 8/2009 | Cairns | H04B 1/712 375/260 |
| 2010/0172256 A1* | 7/2010 | Mallik | H04B 7/0417 370/252 |
| 2010/0232525 A1* | 9/2010 | Xia | H04B 7/0626 375/259 |
| 2010/0238913 A1 | 9/2010 | Xia et al. | |
| 2011/0105164 A1* | 5/2011 | Lim | H04B 7/0417 455/501 |
| 2011/0116563 A1* | 5/2011 | Vitthaladevuni | H04L 1/0001 375/260 |
| 2011/0161675 A1* | 6/2011 | Diard | G06F 21/6281 713/189 |
| 2011/0250926 A1* | 10/2011 | Wietfeldt | H01Q 1/243 455/525 |
| 2011/0261675 A1* | 10/2011 | Lee | H04B 7/04 370/203 |
| 2012/0002750 A1* | 1/2012 | Hooli | H04B 7/0417 375/295 |
| 2012/0082248 A1 | 4/2012 | Han et al. | |
| 2013/0003812 A1* | 1/2013 | Collotta | H04B 7/0417 375/227 |
| 2013/0044650 A1* | 2/2013 | Barker | H04B 7/0617 370/278 |
| 2013/0148611 A1 | 6/2013 | Moulsley et al. | |
| 2013/0155968 A1 | 6/2013 | Pelletier et al. | |
| 2013/0223245 A1* | 8/2013 | Taoka | H04L 25/03343 370/252 |
| 2014/0016549 A1 | 1/2014 | Novlan et al. | |
| 2014/0072065 A1 | 3/2014 | Nammi | |
| 2014/0169493 A1 | 6/2014 | Hammarwall et al. | |
| 2014/0205031 A1 | 7/2014 | Nammi | |
| 2015/0288435 A1 | 10/2015 | Nammi | |

FOREIGN PATENT DOCUMENTS

| | | |
|---|---|---|
| WO | 2010102583 A1 | 9/2010 |
| WO | 2011159963 A1 | 12/2011 |
| WO | 2013/023291 A1 | 2/2013 |
| WO | 2014027949 A2 | 2/2014 |
| WO | 2014/040771 A1 | 3/2014 |
| WO | 2015190956 A1 | 12/2015 |

OTHER PUBLICATIONS

Author Unknown, "Technical Specification Group Radio Access Network; Evolved Universal Terrestrial Radio Access (E-UTRA); Physical channels and modulation (Release 8)," Technical Specification 36.211, Version 8.0.0, 3GPP Organizational Partners, Sep. 2007, 50 pages.

Author Unknown, "Technical Specification Group Radio Access Network; Evolved Universal Terrestrial Radio Access (E-UTRA); Physical layer procedures (Release 10)," Technical Specification 36.213, Version 10.0.0, 3GPP Organizational Partners, Dec. 2010, 98 pages.

Yang, H.J. et al., "Codebook-Based Lattice-Reduction-Aided Precoding for Limited-Feedback Coded MIMO Systems," IEEE Transactions on Communications, vol. 60, No. 2, Feb. 2012, pp. 510-524.

Author Unknown, "3rd Generation Partnership Project; Technical Specification Group Radio Access Network; Multiplexing and channel coding (FDD) (Release 11)," Technical Specification 25.212, Version 11.7.0, Mar. 2014, 3GPP Organizational Partners, 162 pages.

International Search Report and Written Opinion for International Patent Application No. PCT/EP2015/074796, dated Jan. 7, 2016, 14 pages.

Ericsson, "R1-124503: Codebook Subset Restriction in Four Branch MIMO System," 3rd Generation Partnership Project (3GPP), TSG-RAN WG1 #70bis, Oct. 8-12, 2012, 5 pages, San Diego, USA.

International Search Report for International Patent Application No. PCT/SE2014/050691, dated Jan. 23, 2015, 4 pages.

Non-Final Office Action for U.S. Appl. No. 15/314,454, dated May 1, 2018, 34 pages.

Non-Final Office Action for U.S. Appl. No. 15/314,454, dated Jul. 3, 2019, 35 pages.

\* cited by examiner

CODEBOOK RESTRICTION

TECHNICAL FIELD

The present disclosure relates to closed-loop codebook based precoding in a Multiple-Input-Multiple-Output (MIMO) wireless communication system.

BACKGROUND

Multiple-Input-Multiple-Output (MIMO) is an advanced antenna technique utilized in wireless systems (e.g., cellular communications networks) to improve spectral efficiency and thereby boost overall system capacity. For MIMO, a commonly known notation of (M×N) is used to represent the MIMO configuration in terms the number of transmit antennas (M) and the number of receive antennas (N). The common MIMO configurations used or currently discussed for various technologies are: (2×1), (1×2), (2×2), (4×2), (8×2), and (8×4). The MIMO configurations represented by (2×1) and (1×2) are special cases of MIMO, and they correspond to transmit diversity and receive diversity, respectively.

Using multiple antennas at the transmitter and the receiver can significantly increase system capacity. Specifically, transmission of independent symbol streams in the same frequency bandwidth, which is commonly referred to as Spatial Multiplexing (SM), achieves a linear increase in data rates with the increased number of antennas. On the other hand, by using space-time codes at the transmitter, reliability of the detected symbols can be improved by exploiting the so called transmit diversity. Both the SM scheme and the transmit diversity scheme assume no channel knowledge at the transmitter. However, in practical wireless systems such as the 3$^{rd}$ Generation Partnership Project (3GPP) Long Term Evolution (LTE), High Speed Downlink Packet Access (HSDPA), and WiMAX wireless systems, channel knowledge can be made available at the transmitter via feedback from the receiver to the transmitter. The transmitter can utilize this channel information to improve the system performance with the aid of precoding. In addition to beamforming gain, the use of precoding avoids the problem of an ill-conditioned channel matrix.

In practice, complete Channel State Information (CSI), or similar known channel properties, may be available for a wireless system using a Time Division Duplexing (TDD) scheme by exploiting channel reciprocity. However, for a wireless system using a Frequency Division Duplexing (FDD) scheme, complete CSI is more difficult to obtain. In a FDD wireless system, some kind of CSI knowledge may be available at the transmitter via feedback from the receiver. These wireless systems are referred to as limited feedback systems. There are many implementations of limited feedback systems such as, e.g., codebook based feedback and quantized channel feedback. 3GPP Long Term Evolution (LTE), High Speed Packet Access (HSPA), and WiMax recommend codebook based feedback for precoding. Examples of CSI are Channel Quality Indicator (CQI), Precoding Indicator (PCI) (which is also referred to as a Precoding Matrix Indicator (PMI)), and a Rank Indicator (RI). One type of CSI or a combination of different types of CSI are used by a network node (e.g., a base station such as, for instance, a Node B (NB) in a Universal Terrestrial Radio Access (UTRA) network or an evolved or enhanced Node B (eNB) in LTE) for one or more resource assignment related tasks such as, e.g., scheduling data transmissions to a User Equipment device (UE), rank adaptation of MIMO streams, precoder selection for MIMO streams, etc.

In codebook based precoding, a predefined codebook is defined both at the transmitter and at the receiver. The entries of the codebook, which are commonly referred to as precoding matrices, can be constructed using different methods, e.g., Grassmannian, Lloyd's algorithm, Discrete Fourier Transform (DFT) matrix, etc. Each precoder matrix is often chosen to match the characteristics of the N×M MIMO channel matrix H for a particular number of transmit antennas (M) and receive antennas (N), resulting in so-called channel dependent precoding, where N≥1 and M≥1. This channel dependent precoding is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced. At the receiver, it is common to find the Signal to Interference plus Noise Ratio (SINR) with different codebook entries and choose the rank/precoding index that gives highest spectral efficiency (capacity).

In the 3GPP LTE standards, separate codebooks are defined for various combinations of the number of transmit antennas and the number of transmission layers. The latter is also referred to as a RI or rank information. For example, for four transmit antennas, a total of 64 precoding vectors and matrices are defined. Also, for each rank in the codebook for the scenarios of RI=1, 2, 3, and 4, 16 elements per rank are defined. The 3GPP standards do not specify what criteria the UE should use to compute the RI and/or the optimum precoding matrices/vectors. In LTE, the eNB scheduler decides the parameters such as, for example, modulation and code rate (transport block size), PMI, and rank information for the data transmission (i.e., on the Physical Downlink Shared Channel (PDSCH)). These parameters are sent to the UE through the Physical Downlink Control Channel (PDCCH). After transmitting the PDCCH, the data channel (i.e., the PDSCH) is also transmitted to the UE. In LTE, the UE may send feedback information related to the PDSCH on any of the uplink control or data channels (i.e., the PUCCH and the Physical Uplink Shared Channel (PUSCH)).

Table 1 below is a PMI codebook for four transmit antennas as defined in 3GPP TS 36.211 (version 8.0). In Table 1, the number of layers is the rank, which is also the number of independent streams. Also, $u_n$ is the basis vector where n goes from 0 to 15.

TABLE 1

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |

TABLE 1-continued

| Codebook index | $u_n$ | Number of layers v | | | |
|---|---|---|---|---|---|
| | | 1 | 2 | 3 | 4 |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$$P_{PMI} = I_4 - (2u_{PMI} u_{PMI}^H / \|u_{PMI}\|^2),$$

one could obtain the precoding matrix $W_{PMI}$ for different ranks by selecting/permuting the appropriate columns of matrix $P_{PMI}$ for the considered PMI, as given in 3GPP TS 36.211.

The 3GPP standards do not specify what criteria the UE should use to compute the RI and/or the optimum precoding matrices/vectors. Note that the received SINR at the output of the MIMO detector (Minimum Mean Square Error (MMSE), Maximum Likelihood Detector (MLD), etc.) is a function of channel matrix H, precoding matrix, the noise power spectral density, and the co-channel interference power.

FIG. 1 graphically illustrates the conventional approach for searching the full precoder codebook to find the preferred RI and PMI (PCI in High Speed Packet Access (HSPA)) for a four transmit antenna system. Note that in this approach the precoding codebook contains 16 elements per each rank (layers or streams) as per 3GPP Technical Specification (TS) 36.211 V8.0.0. This conventional approach illustrated in FIG. 1 is an exhaustive search of the full codebook (i.e., for all PCI and RI combinations). As illustrated, for the exhaustive search, the UE estimates the channel to thereby compute the channel coefficients for the channel matrix H. The UE computes the Signal to Noise Ratio (SNR) for each element, or entity, in the full codebook (i.e., for each PCI and RI combination). The UE computes the capacity (C) of the channel for each element in the full codebook using the formula $C=\log_2(1+SNR)$. The UE then finds or selects the PCI and RI combination that provides the maximum capacity (C). The exhaustive search involves many computations and is impractical to implement when there are a large number of codebook entries.

Issues with codebook based precoding in a closed-loop MIMO wireless system arise from the fact that the performance of the system generally improves with the cardinality (i.e., size) of the codebook. Specifically, at the receiver, the receiver must evaluate all possible precoding matrices for all possible ranks for a given MIMO configuration (M×N) and report a RI and a PCI for the best rank and precoding matrix to the transmitter every Transmit Time Interval (TTI) or every few TTIs. Evaluating all possible precoding matrices for all possible ranks is a computationally intensive process. For example, in four branch MIMO in LTE, the UE must search 64 precoding matrices (also referred to as precoding entities) for finding the best rank and precoding matrix. This search of the 64 precoding matrices increases power consumption, drains UE battery life, and consumes more memory and processing resources at the UE. Furthermore the network node serving the UE may not always use a full set of CSI (e.g., a full set of ranks and precoding matrices). In this case, if the UE reports CSI (e.g., a RI and a PCI) out of the full set of CSI (e.g., all possible ranks and precoding matrices), then the network node may need to spend more resources or perform additional processing to identity an appropriate CSI for scheduling the UE.

U.S. Patent Application Publication No. 2014/0072065 A1 entitled FINDING CHANNEL STATE INFORMATION WITH REDUCED CODEBOOK IN A MULTI-ANTENNA WIRELESS COMMUNICATION SYSTEM discloses a reduction in the search space of precoder elements by restricting the search space to lower rank precoder elements. While this approach is beneficial, there still remains a need for additional mechanisms for reducing the search space of precoder elements for a closed-loop MIMO wireless system.

SUMMARY

Systems and methods for codebook restriction for closed-loop codebook-based precoding in a Multiple-Input-Multiple-Output (MIMO) wireless communications system based on antenna correlation are disclosed. In some embodiments, a method of operation of a wireless device to provide feedback for a closed-loop codebook-based precoding system is provided. The method comprises determining a codebook restriction based on an antenna correlation for a MIMO channel between a network node and the wireless device. The antenna correlation is transmit antenna correlation, receive antenna correlation, or both transmit and receive antenna correlation. The codebook restriction is a restriction that reduces a full codebook of the wireless device to a reduced codebook. The method of operation of the wireless device further comprises generating a feedback report using the reduced codebook and transmitting the feedback report to the network node. By generating the feedback report using the reduced codebook, complexity is substantially reduced.

In some embodiments, the method of operation of the wireless device further comprises estimating the MIMO channel between the network node and the wireless device to provide a channel estimate. Determining the codebook restriction based on the antenna correlation comprises computing a correlation matrix for the MIMO channel based on the channel estimate, computing a correlation metric indicative of the antenna correlation based on the correlation matrix, and determining the codebook restriction based on the correlation metric. Further, in some embodiments, determining the codebook restriction based on the correlation metric comprises identifying a correlation zone for the correlation metric, where the correlation zone is one of multiple predefined correlation zones each corresponding to a different range of correlation metric values and having a different predefined codebook restriction. Determining the codebook restriction further comprises selecting the predefined codebook restriction of the correlation zone identified for the correlation metric as the codebook restriction.

In some embodiments, generating the feedback report using the reduced codebook comprises computing a capacity of the MIMO channel for each element in the reduced codebook and selecting the element in the reduced codebook having a maximum capacity from among the entities in the reduced codebook as a select element to be included in the feedback report.

In some embodiments, the antenna correlation is the transmit antenna correlation and the receive antenna correlation. In other embodiments, the antenna correlation is the transmit antenna correlation. In some other embodiments, the antenna correlation is the receive antenna correlation.

In some embodiments, the full codebook comprises precoding matrices for each of a plurality of ranks, and the codebook restriction is a restriction on the ranks such that the reduced codebook comprises the precoding matrices for a reduced set of the ranks.

In some embodiments, determining the codebook restriction based on the antenna correlation comprises selecting a first codebook restriction as the codebook restriction if a correlation metric representative of the antenna correlation is in a first range and selecting a second codebook restriction as the codebook restriction if the correlation metric representative of the antenna correlation is in a second range.

In some embodiments, the network node is a radio access node in a cellular communications network. In some embodiments, the cellular communications network is a Long Term Evolution (LTE) network. In other embodiments, the cellular communications network is a High Speed Packet Access (HSPA) network.

Embodiments of a wireless device enabled to provide feedback for a closed-loop codebook-based precoding system is provided. In some embodiments, the wireless device comprises a transceiver comprising a transmitter and a receiver, at least one processor circuit, and memory containing software instructions executable by the at least one processor circuit whereby the wireless device is operative to perform any of the embodiments of the method of operation of the wireless device described above.

Embodiments of a method of operation of a network node to provide codebook restriction are also disclosed. In some embodiments, the method of operation of the network node comprises determining a codebook restriction based on an antenna correlation for a MIMO channel between the network node and a wireless device. The antenna correlation is a transmit antenna correlation, a receive antenna correlation, or both the transmit antenna correlation and the receive antenna correlation. The codebook restriction is a restriction that reduces a full codebook of the wireless device to a reduced codebook. The method of operation of the network node further comprises communicating the codebook restriction to the wireless device.

In some embodiments, the method of operation of the network node further comprises estimating the MIMO channel to provide a channel estimate. Determining the codebook restriction based on the antenna correlation comprises computing a correlation matrix for the MIMO channel based on the channel estimate, computing a correlation metric indicative of the antenna correlation based on the correlation matrix, and determining the codebook restriction based on the correlation metric.

In some embodiments, determining the codebook restriction based on the correlation metric comprises identifying a correlation zone for the correlation metric, where the correlation zone is one of multiple predefined correlation zones each corresponding to a different range of correlation metric values and having a different predefined codebook restriction. Determining the codebook restriction further comprises selecting the predefined codebook restriction of the correlation zone identified for the correlation metric as the codebook restriction.

In some embodiments, the antenna correlation is the transmit antenna correlation and the receive antenna correlation. In other embodiments, the antenna correlation is the transmit antenna correlation. In some other embodiments, the antenna correlation is the receive antenna correlation.

In some embodiments, the full codebook comprises precoding matrices for each of multiple ranks, and the codebook restriction is a restriction on the ranks such that the reduced codebook comprises the precoding matrices for a reduced set of the ranks.

In some embodiments, determining the codebook restriction based on the antenna correlation comprises selecting a first codebook restriction as the codebook restriction if a correlation metric representative of the antenna correlation is in a first range and selecting a second codebook restriction as the codebook restriction if the correlation metric representative of the antenna correlation is in a second range.

In some embodiments, communicating the codebook restriction to the wireless device comprises transmitting the codebook restriction to the wireless device. In other embodiments, communicating the codebook restriction to the wireless device comprises sending the codebook restriction to a radio network controller responsible for signaling the codebook restriction to the wireless device.

In some embodiments, the network node is a radio access node in a cellular communications network. In some embodiments, the cellular communications network is a LTE network. In other embodiments, the cellular communications network is a HSPA network.

Embodiments of a network node enabled to restrict a codebook search space of a wireless device are also disclosed. In some embodiments, the network node comprises a transceiver including a transmitter and a receiver, at least one processor circuit, and memory containing software instructions executable by the at least one processor circuit whereby the network node is operative to perform the method of operation of the network node described above.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 graphically illustrates a conventional approach when searching a full precoder codebook to find a preferred Rank Indicator (RI) and Precoding Matrix Indicator (PMI) (Precoding Indicator (PCI) in High Speed Packet Access (HSPA)) for a four transmit antenna system;

DETAILED DESCRIPTION

Figure 1:
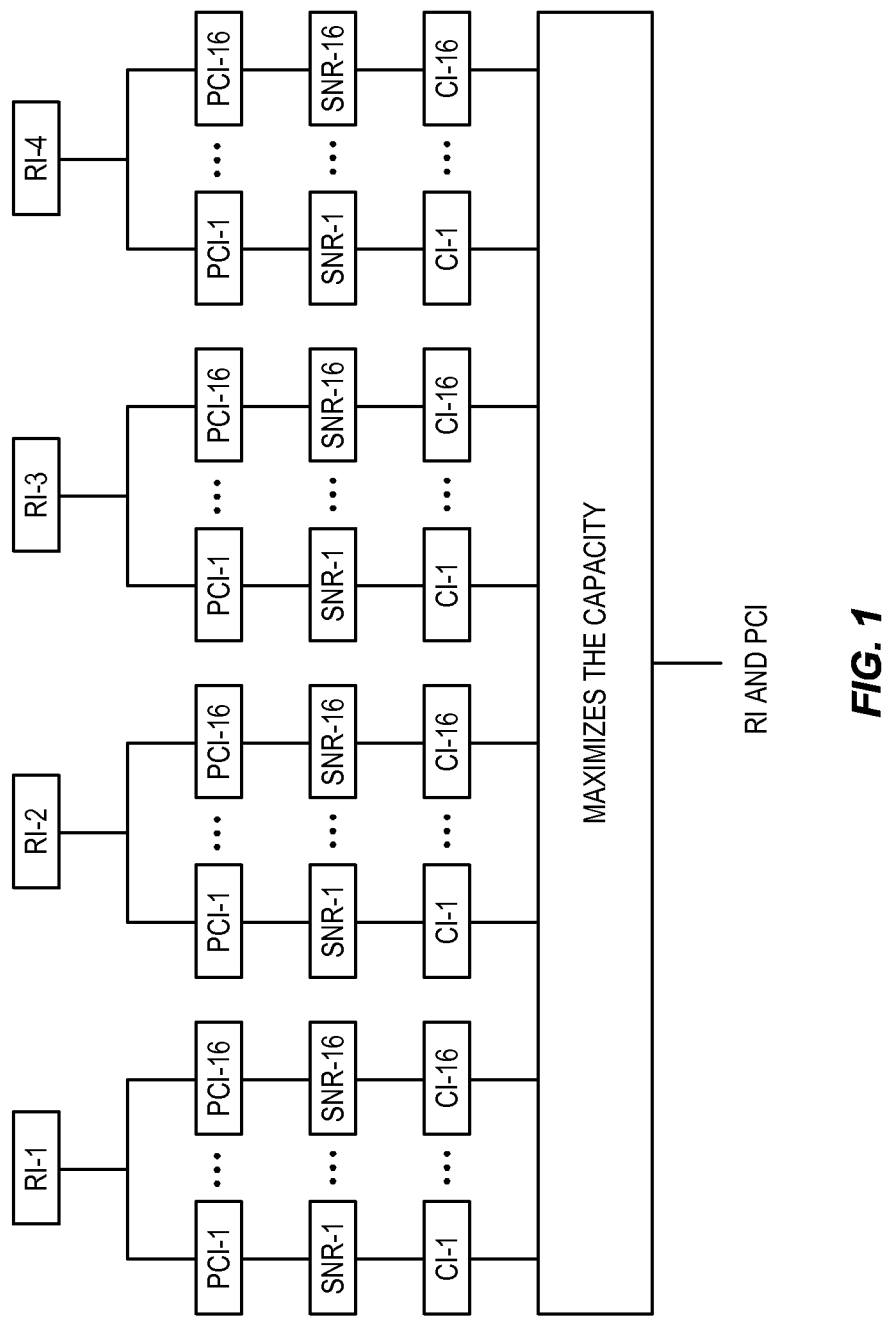

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the description below, the non-limiting term radio network node or simply network node is sometimes used and refers to any type of network node serving a User Equipment device (UE) and/or connected to other network node(s) or network element(s) or any radio node from where a UE receives a signal. Examples of radio network nodes are a Node B, a base station, a Multi-Standard Radio (MSR) radio node such as a MSR base station, an enhanced or evolved Node B (eNB), a network controller, a Radio Network Controller (RNC), a Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), a node in a Distributed Antenna System (DAS), etc.

Further, in the description below, the non-limiting term UE is sometimes used and refers to any type of wireless device communicating with a radio network node in a wireless system, e.g., a cellular or mobile communications system. Examples of a UE include a target device, a Device-to-Device (D2D) UE, a machine-type UE or UE capable of Machine-to-Machine (M2M) communication, a Personal Digital Assistant (PDA), a tablet computer, a mobile terminal, a smart phone, a Laptop Embedded Equipment (LEE), a Laptop Mounted Equipment (LME), a Universal Serial Bus (USB) dongle, etc.

Many of the embodiments described below are described with respect to closed-loop Multiple-Input-Multiple-Output (MIMO) operation in Universal Terrestrial Radio Access (UTRA)/High Speed Packet Access (HSPA). However, the embodiments disclosed herein are applicable to any Radio Access Technology (RAT) or multi-RAT system where the UE operates using closed-loop MIMO such as, e.g., $3^{rd}$ Generation Partnership Project (3GPP) Long Term Evolution (LTE) Frequency Division Duplexing (FDD)/Time Division Duplexing (TDD), Global System for Mobile Communications (GSM)/GSM Enhanced Data Rates for GSM Evolution Radio Access Network (GERAN), Wi-Fi, Wireless Local Area Network (WLAN), WiMax, Wideband Code Division Multiple Access (WCDMA), HSPA, etc. Note that a 4×4 MIMO system is considered in some of the example embodiments below; however, the concepts disclosed herein are equally applicable for 2Tx, 8Tx, and N×M MIMO systems.

Further, the embodiments described herein are applicable to single carrier as well as to Multi Carrier (MC) or Carrier Aggregation (CA) operation of the UE in conjunction with MIMO in which the UE is able to receive and/or transmit data to more than one serving cell using MIMO. The term CA is also called (e.g., interchangeably called) "multi-carrier system," "multi-cell operation," "multi-carrier operation," and "multi-carrier" transmission and/or reception.

Systems and methods for codebook restriction for closed-loop codebook-based precoding in a MIMO wireless communications system based on antenna correlation are disclosed. The codebook restriction reduces the set of codebook elements that are evaluated for selection and feedback of the best or preferred codebook element from the set of all codebook elements in the full codebook to a reduced set of codebook elements from the full codebook (e.g., only those codebook elements for a certain rank(s)). In other words, the codebook restriction reduces or restricts the search space of codebook elements that are evaluated from all codebook elements in the full codebook to a subset of the codebook elements in the full codebook.

Specifically, the inventors found that antenna correlation can be used as a parameter to reduce the search space of the UE for closed-loop codebook-based precoding. In order to illustrate this concept, a discussion of antenna correlation in a MIMO wireless communications system is beneficial. In general, in the following discussion, the MIMO wireless communications system is an eNB and a UE in a 3GPP LTE network. However, the concepts are more generally applicable to other types of MIMO wireless communications systems. The signals transmitted/received are correlated when the spacing between the antennas is small. As used herein, transmit antenna correlation is the correlation between the transmit antennas for the MIMO channel, whereas the receive antenna correlation is the correlation between the receive antennas for the MIMO channel. For example, for a MIMO channel having four transmit antennas and four receive antennas (4×4 MIMO), the transmit antenna correlation is the correlation between the four transmit antennas, and the receive antenna correlation is the correlation between the four receive antennas. For the eNB and UE downlink scenario, the transmit antenna correlation is the correlation between the transmit antennas of the eNB, and the receive antenna correlation is the correlation between the receive antennas at the UE.

Figure 2:
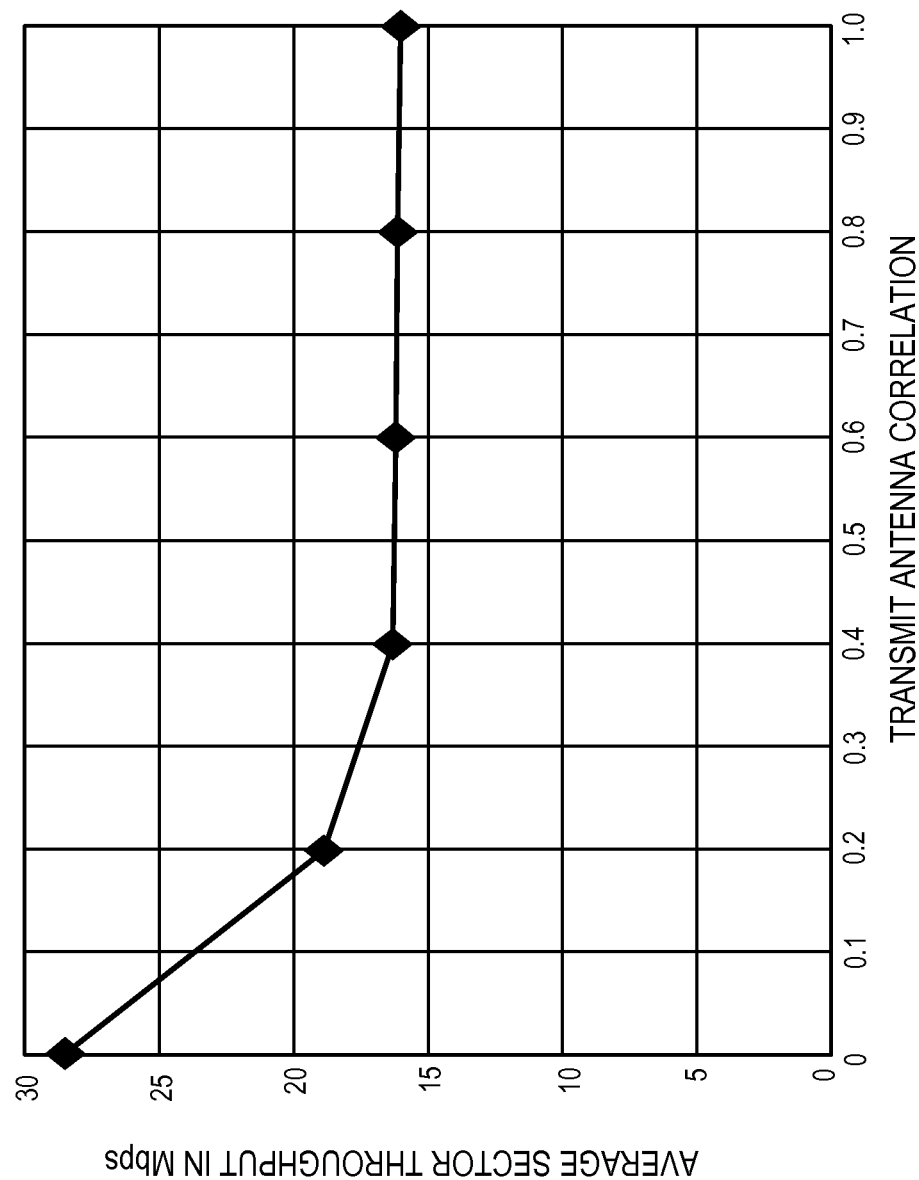
FIG. 2 shows the simulated system performance of a 4×4 closed loop Multiple-Input-Multiple-Output (MIMO) system (transmission mode 4 for Long Term Evolution (LTE) downlink) with different values of transmit antenna correlation.

FIG. 2 shows the simulated system performance of a 4×4 closed loop MIMO system (Transmission mode 4 for LTE downlink) with different values of transmit antenna correlation. In the simulations, UEs are scheduled using wideband parameters, which means that the rank and precoding index and Channel Quality Indicator (CQI) are computed over the whole frequency bandwidth of Orthogonal Frequency Division Multiplexing (OFDM). The transmit antenna correlation (i.e., the correlation between the transmit antennas of the MIMO channel) is modeled according to 3GPP Technical Specification (TS) 36.101 V8.0.0 Appendix B. In the simulations, the antennas are assumed to be co-polarized. This implies that the correlation matrix R can be written as $$R = R_{eNB,4\times4} \otimes R_{UE,4\times4} R = R_{eNB,4\times4} \otimes R_{UE,4\times4} \quad (1)$$

where $\otimes$ denotes the Kronecker product.

$$R_{eNB,4\times4} = \begin{bmatrix} 1 & \alpha^{1/9} & \alpha^{4/9} & \alpha \\ (\alpha^{1/9})^* & 1 & \alpha^{1/9} & \alpha^{4/9} \\ (\alpha^{4/9})^* & (\alpha^{1/9})^* & 1 & \alpha^{1/9} \\ \alpha^* & (\alpha^{4/9})^* & (\alpha^{1/9})^* & 1 \end{bmatrix} \quad (2)$$

is the transmit antenna correlation matrix at the eNB, and $$R_{UE,4\times4} = \begin{bmatrix} 1 & \beta^{1/9} & \beta^{4/9} & \beta \\ (\beta^{1/9})^* & 1 & \beta^{1/9} & \beta^{4/9} \\ (\beta^{4/9})^* & (\beta^{1/9})^* & 1 & \beta^{1/9} \\ \beta^* & (\beta^{4/9})^* & (\beta^{1/9})^* & 1 \end{bmatrix} \quad (3)$$

is the receive antenna correlation matrix at the UE.

In the simulations, the value of $\alpha$ (transmit antenna correlation) is varied and the value of $\beta$ (receive antenna correlation) is chosen as zero (which means no receive antenna correlation). From FIG. 2, it can be observed that the system performance (average sector throughput on y-axis in FIG. 2) degrades as the correlation between the transmit antennas increases. Notably, a cell or sector is a physical area where the eNB uses one unique identifier (cell ID) for transmission. The system performance degrades as the correlation between the transmit antennas increases because, as the transmit antenna correlation increases, the channel becomes less orthogonal and spatial multiplexing cannot be supported with those channels.

Figure 3:
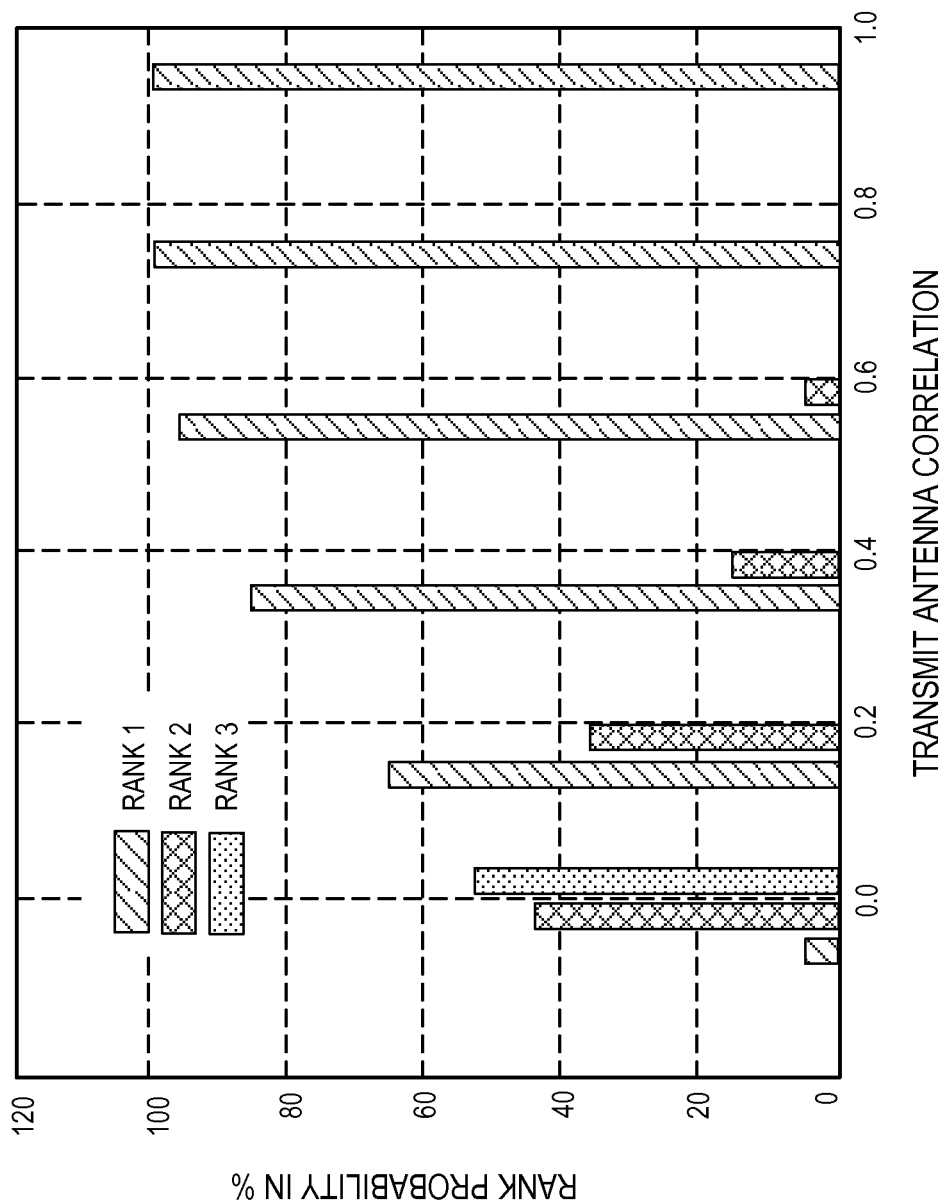
FIG. 3 shows simulated rank distribution in percentage as a function of transmit antenna correlation.

FIG. 3 shows the rank distribution in percentage as a function of transmit antenna correlation. Note that when there is no transmit antenna correlation, there is higher probability that the receiver will select rank 3 and rank 2, thereby proving spatial multiplexing gains. However, when the transmit antenna correlation increases, the probability of rank 3 reduces, and the probability of rank 1 increases. As the transmit antenna correlation keeps increasing (e.g., increases to 0.8), all the UEs report rank 1 transmission. Note that while the simulations discussed above with respect to FIGS. 2 and 3 are for 4×4 MIMO with zero receive antenna correlation, similar results occur when there is a non-zero receive antenna correlation and for other MIMO configurations.

Based on the results of the simulations illustrated in FIGS. 2 and 3, the inventors found that the computational complexity for searching the codebook to find, or select, the best or preferred codebook element (e.g., the best or preferred rank (e.g., Rank Indicator (RI)) and precoding matrix (e.g., Precoding Matrix Indicator (PMI)) combination) can be reduced by restricting or reducing the search space (i.e., restricting or reducing the portion of the codebook searched) based on the antenna correlation (transmit antenna correlation and/or receive antenna correlation). Note that rank is the number of layers (or in other words the number of independent transmit streams). One or more precoding matrices (typically multiple precoding matrices) are defined for each rank.

Systems and methods for reducing, or restricting, the codebook (i.e., reducing the search space) considered when selecting the best, or preferred, codebook element (e.g., rank and precoding matrix combination) are disclosed. As used herein, a codebook includes a number of precoding matrices for each of a number of ranks. A codebook element is a precoding matrix for a particular rank, which is also referred to herein as a rank and precoding matrix combination. In general, in some embodiments, a wireless device (e.g., a UE) estimates the antenna correlation (i.e., transmit antenna correlation and/or receive antenna correlation) and then determines a codebook restriction based on the antenna correlation. In some embodiments, the codebook restriction is a rank restriction. The rank restriction may restrict the ranks to thereby define a reduced codebook. The reduced codebook then includes only those entries from the full codebook for the non-restricted ranks (i.e., the reduced codebook includes only those precoding matrices from the full codebook for the non-restricted ranks). For example, if the antenna correlation is high (i.e., above a predefined threshold), then the search space may be restricted to rank 1 and rank 2 or only rank 1 to thereby reduce computational complexity for the search. In this manner, there is an automatic or inherent elimination of the precoding matrices (e.g., PMIs) for the restricted ranks from the full codebook to thereby provide the reduced codebook.

Figure 4:
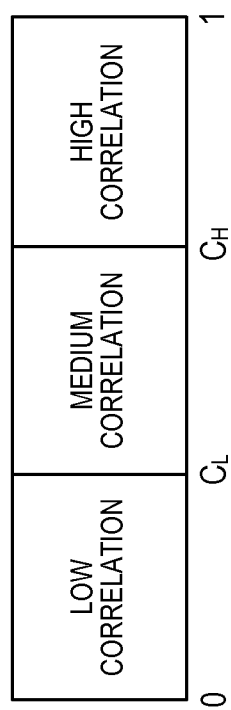
FIG. 4 illustrates a number of correlation zones having different codebook restrictions that can be utilized to provide codebook restriction based on antenna correlation according to some embodiments of the present disclosure.

One example is illustrated in FIG. 4. In this example, the correlation range, which in this example is 0 (no correlation) to 1 (perfect correlation), is divided into three zones, namely:

a low correlation zone where the antenna correlation is greater than or equal to 0 and less than $C_L$, a medium correlation zone where the antenna correlation is greater than or equal to $C_L$ and less than $C_H$, and a high correlation zone where the antenna correlation is greater than or equal to $C_H$ and less than or equal to 1.

Note that while the example of FIG. 4 uses three correlation zones, any number of two or more correlation zones may be used. The correlation thresholds (e.g., $C_L$ and $C_H$ in the example of FIG. 4) are predetermined thresholds. As an example, $C_L$ may be 0.2, and $C_H$ may be 0.8. However, this is only an example.

In some embodiments, the correlation thresholds and, in some embodiments, the number of correlation zones, may be determined by simulation or analysis. For example, the correlation thresholds and, in some embodiments, the number of correlation zones may be determined based on simulated performance results, such as simulating the receiver existing in the UE with a set of different channel profiles. Then, results of estimated correlation values and corresponding reception performance can be obtained and used to determine the appropriate values for the correlation thresholds and, in some embodiments, the number of correlation zones. However, this is just an example, the correlation thresholds and the number of correlation zones may be predetermined or predefined in any suitable manner. Further, the correlation thresholds may depend on one or more other parameters such as, for example, signal quality (e.g., Signal to Noise Ratio (SNR)) and/or UE receiver type. For example, if the UE has a Maximum-Likelihood (ML) based receiver, the UE may handle high correlation in a better way than if the UE were to use a more standard Minimum Mean Square Error (MMSE) based receiver. So, the UE equipped with a ML receiver may have a higher correlation threshold between the correlation regions. For example, a UE equipped with a MMSE based receiver may use $C_L$=0.2 and $C_H$=0.8, whereas a UE equipped with a ML receiver may use $C_L$=0.5 and $C_H$=0.9. In addition to dependence on receiver type, the limits may depend on SNR levels. For example, when there is a low SNR value, the UE is less likely to select a higher rank and, as such, the correlation thresholds may be set appropriately.

Also, the number of correlation zones may depend on parameters such as, for example, UE receiver type. For example, a UE that is capable of operation with different receiver types may use a different number of correlation zones depending on the UE receiver type used by the UE. The receiver type selection can, e.g., be made from complexity constraints such as when a more complex receiver can only be used in limited number of layers, limited bandwidths or for lower modulation orders; or when large allocations might fill up various buffers or time constraints for advanced algorithms.

Figure 5:
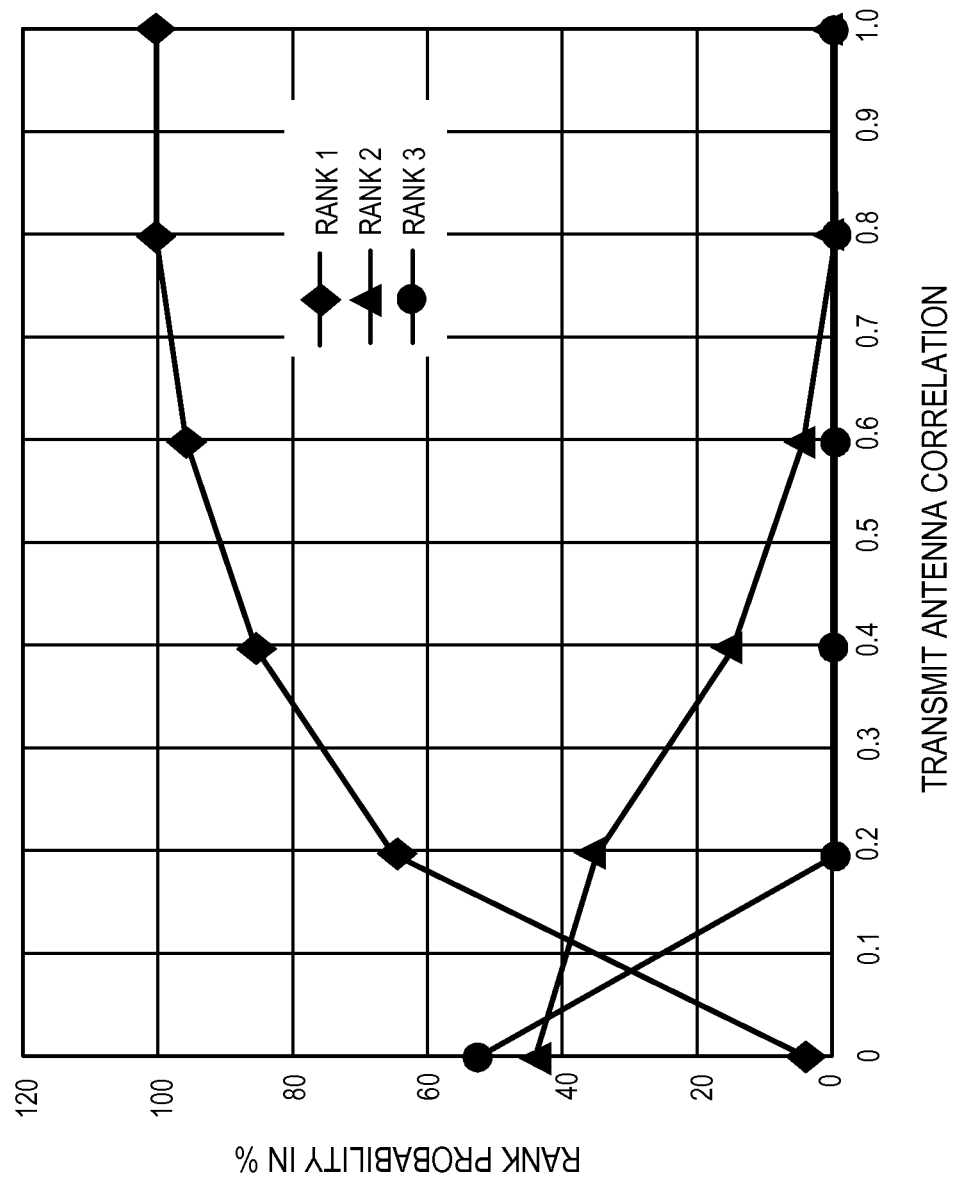
FIG. 5 illustrates one example of results of a simulation of individual rank probability in percentage as a function of transmit antenna correlation that can be used to determine the values for the correlation thresholds of FIG. 4 according to some embodiments of the present disclosure.

As an example, FIG. 5 illustrates results of a simulation of individual rank probability in percentage as a function of transmit antenna correlation that can be used to determine the values for the correlation thresholds of FIG. 4. It can be seen from FIG. 5 that, when the transmit antenna correlation is less than or equal to 0.2, the UE searches codebook elements corresponding to rank 1, rank 2, and rank 3. This is referred to as the low correlation zone. When the transmit antenna correlation is in between 0.2 and 0.8, the UE will search codebook elements corresponding to rank 1 and rank 2. This region is referred to as the medium correlation zone. When the transmit antenna correlation is greater than or equal to 0.8, the UE only searches codebook elements corresponding to rank 1. This region is referred to as the high correlation zone.

The correlation zones may also depend on the CQI reporting format. If the CQI reporting is set up with differential CQI reporting, i.e., in order to save bits in the CQI report, the CQI for the different codewords are not allowed to differ more than a certain amount. Then, for a highly correlated channel, the difference between the codewords may expected to be high. Since this large difference is not possible to report due to the use of differential CQI reporting, searching the higher ranks may be excluded for this case.

The correlation zones of FIG. 4 have associated codebook restrictions. For example, the low correlation zone may have no restrictions (i.e., the restricted or reduced codebook would be the full codebook), the medium correlation zone may have a codebook restriction that defines a restricted codebook that includes only those elements from the full codebook for rank 1 and rank 2, and the high correlation zone may have a codebook restriction that defines a restricted codebook that includes only those elements from the full codebook for rank 1. The correlation zones can then be used for codebook restriction. More specifically, in some embodiments, the UE computes a correlation metric that is indicative of the transmit antenna correlation and/or the receive antenna correlation. The UE then determines a codebook restriction to use based on the correlation metric and the correlation zones. For example, if the correlation metric falls within the low correlation zone, then the corresponding codebook restriction (which in the example above is no restriction) is applied. Conversely, if the correlation metric falls within the medium correlation zone, then the codebook restriction for the medium correlation zone is applied; and, if the correlation metric falls within the high correlation zone, then the codebook restriction for the high correlation zone is applied.

Figure 6:
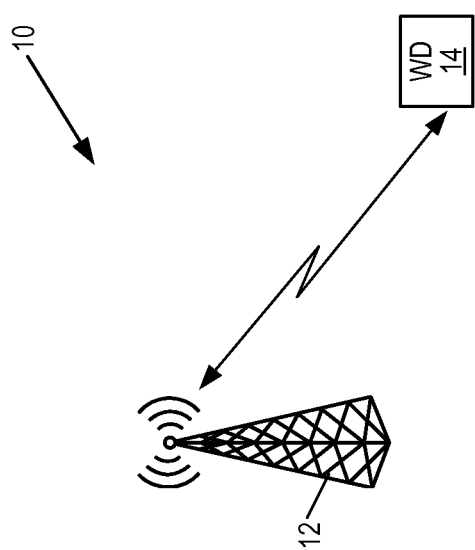
FIG. 6 illustrates a cellular communications network in which codebook restriction is provided according to some embodiments of the present disclosure.

While the codebook restriction techniques described herein can be utilized in any type of MIMO wireless communications system, FIG. 6 illustrates a cellular communications network 10 in which codebook restriction is provided according to some embodiments of the present disclosure. As illustrated, the cellular communications network 10 includes a base station 12 (e.g., an eNB) and a wireless device 14 (e.g., a UE). The downlink from the base station 12 to the wireless device 14 is a MIMO channel (e.g., a 4×4 MIMO channel). In some embodiments, the uplink from the wireless device 14 to the base station 12 is also a MIMO channel. The cellular communications network 10 may be, for example, an LTE network, a HSPA network, or the like.

Figure 7:
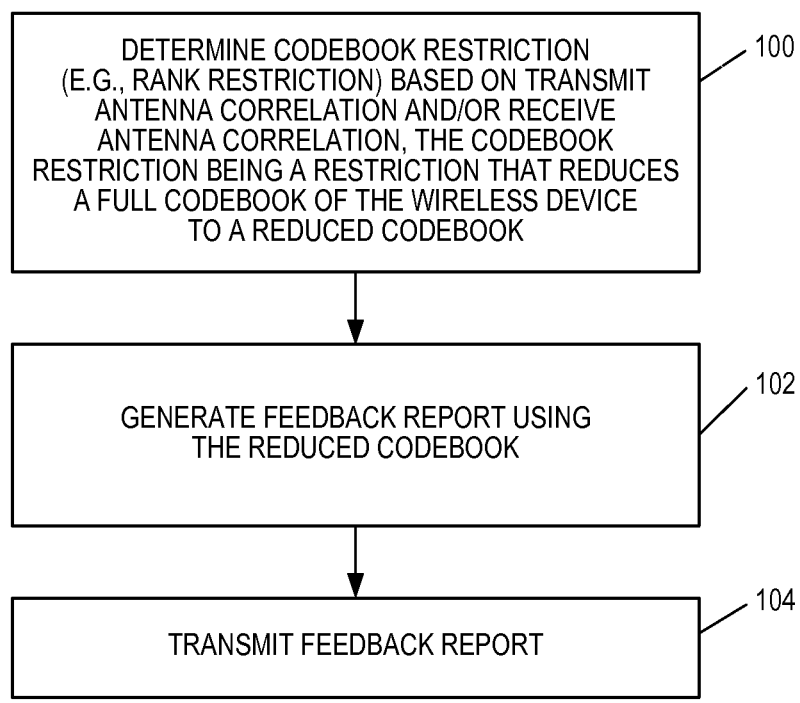
FIG. 7 is a flow chart that illustrates the operation of the wireless device of FIG. 6 to provide codebook restriction (i.e., to reduce or restrict its search space) when searching for a best or preferred rank and precoding matrix (e.g., RI and PMI) for closed-loop codebook-based precoding according to some embodiments of the present disclosure.

FIG. 7 is a flow chart that illustrates the operation of the wireless device 14 to provide codebook restriction (i.e., to reduce or restrict its search space) when searching for the best or preferred rank and precoding matrix (e.g., RI and PMI) for closed-loop codebook-based precoding according to some embodiments of the present disclosure. As illustrated, the wireless device 14 determines a codebook restriction (e.g., a rank restriction) based on transmit antenna correlation and/or receive antenna correlation for the MIMO channel for the downlink from the base station 12 to the wireless device 14 (step 100). The codebook restriction is a restriction on the full codebook of the wireless device 14 (i.e., the full codebook defined for the type of MIMO channel (e.g., a 4×4 MIMO channel)), where this restriction reduces the full codebook to a reduced codebook. In other words, the codebook restriction is a restriction on the full codebook that reduces the search space of the wireless device 14 from the full codebook to a reduced codebook. As used herein, the "search space" of the wireless device 14 is the set of codebook elements that are evaluated by the wireless device 14 when searching for the best or preferred codebook element (e.g., the preferred to best rank and precoding matrix). In one embodiment, the codebook restriction is a rank restriction such that the reduced codebook includes only those elements from the full codebook associated with non-restricted rank(s) (i.e., those ranks that are not restricted).

The wireless device 14 then generates a feedback report using the reduced codebook (step 102). In some embodiments, the wireless device 14 uses the conventional approach to select the best, or preferred, rank and precoding matrix combination that gives the maximum, or best, channel capacity. However, this conventional approach is applied to the reduced codebook rather than the full codebook. In this manner, the search space, and thus the complexity of the search, is reduced. The wireless device 14 then transmits the feedback report to the base station 12 (step 104). In some embodiments, the feedback report includes an indication of the best or preferred codebook element (e.g., the best or preferred RI and PMI) from the reduced codebook.

Figure 8:
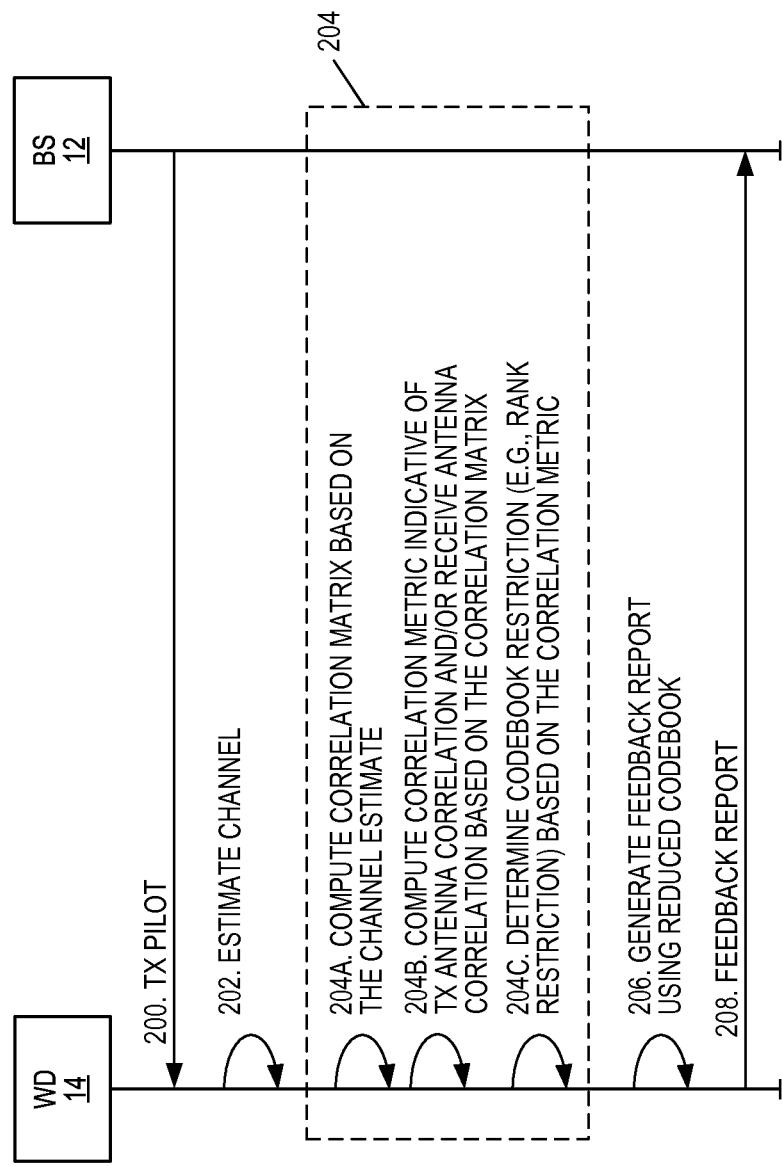
FIG. 8 illustrates the operation of both the wireless device and the base station of FIG. 6 according to some embodiments of the present disclosure.

FIG. 8 illustrates the operation of both the wireless device 14 and the base station 12 according to some embodiments of the present disclosure. As illustrated, the base station 12 transmits a pilot or reference signal (step 200). Using the pilot signal, the wireless device 14 estimates the MIMO channel between the base station 12 and the wireless device 14 to thereby provide a channel estimate (step 202). The channel may be estimated using any suitable technique. Next, the wireless device 14 determines a codebook restriction based on an antenna correlation metric computed from the channel estimate (step 204). Note that step 204 is one embodiment of step 100 of FIG. 7.

More specifically, the wireless device 14 computes a correlation matrix based on the channel estimate (step 204A). While the correlation matrix may be computed using any suitable technique, some examples are provided below. Using a MIMO-OFDM system (e.g., LTE) as an example, let $H_i$ be the computed channel matrix for the $i^{th}$ OFDM subcarrier, and let $N_c$ denote the total number of carriers in the MIMO-OFDM system. Then, in some embodiments, the correlation matrix $R_H$ is computed as $$R_H = \frac{1}{N_C} \sum_{i=1}^{N_c} Vec(H_i)Vec(H_i)^H \quad (4)$$

where $Vec(H_i)$ is a column vector provided by stacking up all the columns of $H_i$. For example, if $H_i=[2\ 3;\ 4\ 5]$ is the channel matrix, then $Vec(H_i)$ is given by $[2\ 3\ 4\ 5]^T$ where $[X]^T$ is the transpose of X. Also $[X]^H$ is the Hermitian operation of the vector X.

In other embodiments, the correlation matrix can be computed based on M realizations as means, where it is averaged over M time intervals as:

$$R_H = \frac{1}{MN_C} \sum_{j=1}^{M} \frac{1}{N_C} \sum_{i=1}^{N_c} Vec(H_i)Vec(H_i)^H \quad (5)$$

In other embodiments, the correlation matrix is computed using the channel matrix $H_i$ rather than the stacked column vector $Vec(H_i)$. This will limit complexity. Also, not all cross-terms will be captured in the correlation, but important properties of the antenna correlation will be able to be detected. In particular, the correlation matrix can be computed as:

$$R_H = \frac{1}{N_C} \sum_{i=1}^{N_c} H_i H_i^H \quad (6)$$

After computing the correlation matrix, the wireless device 14 computes a correlation metric ($C_m$) indicative of transmit antenna correlation and/or receive antenna correlation based on the correlation matrix (step 204B). More specifically, once the correlation matrix is computed, the correlation metric ($C_m$) is computed from the elements of the correlation matrix. Note that the non-diagonal elements of the correlation matrix represents the correlation (i.e., the transmitter and the receiver) values between the antennas. For example for a 2×2 MIMO system, assume that the antenna correlation at the transmitter side (i.e., the transmit antenna correlation) is 0.3, and the antenna correlation at the receiver side (i.e., the receive antenna correlation) is equal to 0. Then, the ideal correlation matrix is of the form $$R_H = \begin{bmatrix} 1.0 & 0.0 & 0.3 & 0.0 \\ 0.0 & 1.0 & 0.0 & 0.3 \\ 0.3 & 0.0 & 1.0 & 0.0 \\ 0.0 & 0.3 & 0.0 & 1.0 \end{bmatrix} \quad (7)$$

In these cases, the correlation metric ($C_m$) can be taken as 0.3. However, in general, when estimating the correlation matrix, the correlation matrix is often of the form where the elements are not symmetrical. For example, if the estimated correlated matrix is of the form $$R_H = \begin{bmatrix} 0.9963 & 0.0031 & 0.299 & 0.0001 \\ 0.0031 & 1.024 & 0.0002 & 0.3015 \\ 0.2999 & 0.0002 & 1.0010 & 0.0004 \\ 0.0001 & 0.3015 & 0.0004 & 0.998 \end{bmatrix}, \quad (8)$$

then the correlation metric ($C_m$) can be computed as:

$$C_m = \frac{mean(nondiag(R_H))}{mean(diag(R_H))} \quad (9)$$

where mean (X) is the average of the elements of X, nondiag(X) is the non-diagonal elements of the matrix X, and diag(X) is the diagonal elements of the matrix X.

In other embodiments, only the maximum value of the non-diagonal elements can be taken in the correlation metric computation, i.e., $$C_m = \frac{max(nondiag(R_H))}{mean(diag(R_H))} \quad (10)$$

In other embodiments, only the minimum value of the non-diagonal elements is used in effective correlation metric computation, i.e., $$C_m = \frac{\min(nondiag(R_H))}{\text{mean}(\text{diag}(R_H))} \quad (11)$$

Note that in all of the embodiments above for computing the correlation metric, the correlation metric should be normalized by the mean of diagonal element.

In the embodiments above, the correlation metric ($C_m$) is indicative of transmit antenna correlation and receive antenna correlation. However, in other embodiments, the correlation metric ($C_m$) is computed such that it is indicative of only transmit antenna correlation or only receive antenna correlation. For example, if the receiver is using cross-polarized antennas, then the receiver correlation matrix is an Identity matrix. In this manner, the correlation metric ($C_m$) can be computed such that it is indicative of only the transmit antenna correlation.

Once the correlation metric ($C_m$) is computed, the wireless device 14 determines the codebook restriction (e.g., rank restriction) based on the correlation metric ($C_m$) (step 204C). More specifically, in some embodiments, multiple correlation zones are defined as discussed above, where each correlation zone has a corresponding, predefined codebook restriction. The wireless device 14 then identifies the correlation zone in which the correlation metric ($C_m$) is located and, by doing so, determines the desired codebook restriction.

From this point, the process proceeds as discussed above with respect to steps 102 and 104 of FIG. 7. Specifically, the wireless device 14 then generates a feedback report using the reduced codebook as defined by the codebook restriction (step 206). In some embodiments, the wireless device 14 uses the conventional approach to select the best, or preferred, codebook element (e.g., rank and precoding matrix combination) that gives the maximum, or best, channel capacity. However, this conventional approach is applied to the reduced codebook rather than the full codebook. In this manner, the search space, and thus the complexity of the search, is reduced. The wireless device 14 then transmits the feedback report to the base station 12 (step 208).

Figure 9:
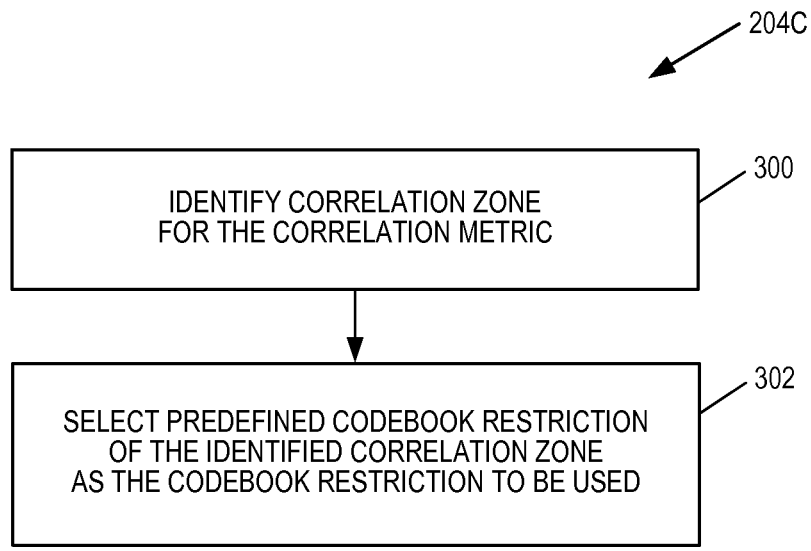
FIG. 9 is a more detailed illustration of a process for determining a codebook restriction according to some embodiments of the present disclosure.

FIG. 9 illustrates step 204C of FIG. 8 in more detail according to some embodiments of the present disclosure. In this embodiment, the possible range of values for the correlation metric ($C_m$) is divided into multiple correlation zones, each having a corresponding, predefined codebook restriction. The codebook restrictions for the correlation zones may be, e.g., statically configured or defined or dynamically configured by, e.g., the network. The wireless device 14 identifies the correlation zone for the correlation metric ($C_m$) (step 300). The correlation zone identified for the correlation metric ($C_m$) is the correlation zone in which the computed correlation metric ($C_m$) is located. The wireless device 14 then selects the predefined codebook restriction for the identified correlation zone as the codebook restriction to be used for the search at the wireless device 14 (step 302).

Figure 10:
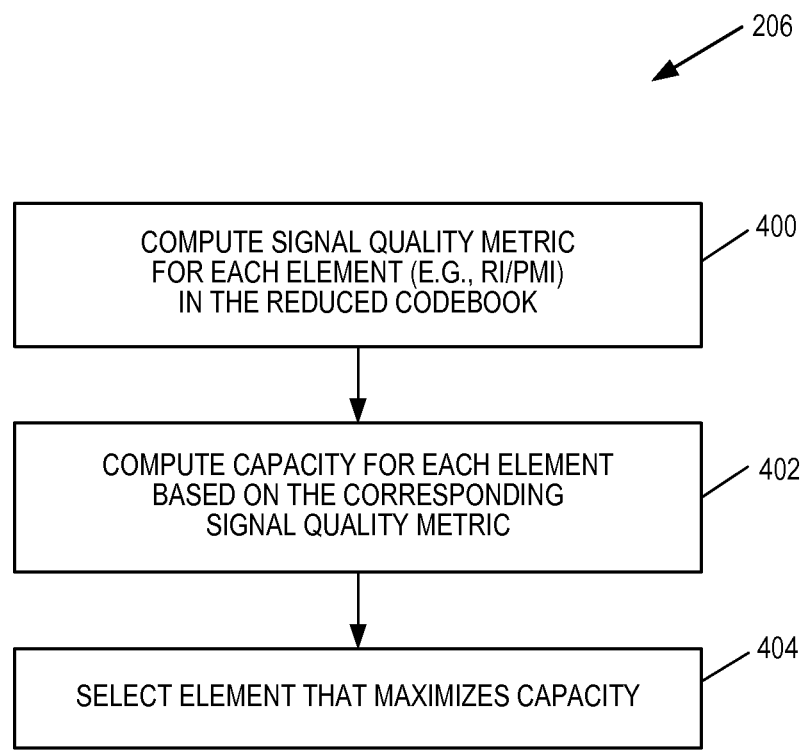
FIG. 10 is a more detailed illustration of a process for generating a feedback report according to some embodiments of the present disclosure.

FIG. 10 illustrates step 206 of FIG. 8 (and likewise step 102 of FIG. 7) in more detail according to one embodiment of the present disclosure. As illustrated, the wireless device 14 computes a signal quality metric (e.g., a SNR value, a Reference Signal Received Power (RSRP) value, or the like) for each element, or entity, (e.g., each PMI/RI combination) in the reduced codebook defined by the codebook restriction determined in step 204C (or likewise step 100) (step 400). The signal quality metric for each codebook element may be computed (or otherwise obtained) using any suitable technique. The wireless device 14 computes a capacity (C) of the MIMO channel for each element in the restricted codebook based on the corresponding signal quality metric (step 402). Thus, for each element (e.g., PMI/RI combination) in the restricted codebook, the wireless device 14 computes the capacity (C) of the MIMO channel for that element using the corresponding signal quality metric. As an example, if the signal quality metrics are SNR values, the capacity (C) for each codebook element can be computed using, for example, $C=\log_2(1+SNR)$. Note that the capacity (C) for each codebook element can alternatively be computed based on mutual information, where the mutual information is a function of SNR. While not essential, the interested reader is directed to "Effective-SNR mapping for modelling frame error rates in multiple-state channels," 3GPP2 RAN1 WG, C30-20030429-010, 2003, vol. 52, no. 4, April 2004 for more information regarding mutual information. The wireless device 14 then selects the element from the restricted codebook corresponding to the maximum capacity as the best or preferred element (e.g., best or preferred PMI/RI) (step 404). The selected codebook element (e.g., PMI and RI) is then indicated in the feedback report.

Figure 11:
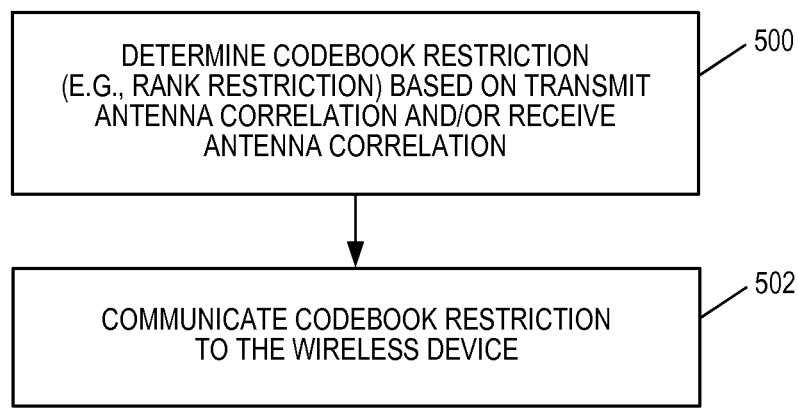
FIG. 11 illustrates the operation of a network node to determine a codebook restriction and communicate the codebook restriction to a wireless device according to some embodiments of the present disclosure.

In the embodiments described thus far, the codebook restriction is determined by the wireless device 14. However, the present disclosure is not limited thereto. FIG. 11 illustrates the operation of a network node (e.g., the base station 12) to determine the codebook restriction and communicate the codebook restriction to the wireless device 14 according to some embodiments of the present disclosure. This embodiment is particularly well suited for a TDD system (e.g., an Evolved Universal Terrestrial Radio Access (E-UTRA)-TDD system) in which there is channel reciprocity between the uplink and downlink channels. As illustrated, the network node determines a codebook restriction (e.g., a rank restriction) for restricting, or reducing, a codebook used by the wireless device 14 when searching for a best, or preferred, element of the codebook to be used for transmission from the base station 12 (or similar radio access node) to the wireless device 14 (step 500). Other than the fact that the determination is made by the network node, the details of how the determination of step 500 is performed are the same as that described above with respect to the wireless device 14. The network node then communicates the codebook restriction to the wireless device 14 (step 502). In some embodiments, the network node is the base station 12, and the base station 12 communicates the codebook restriction to the wireless device 14 by transmitting an indication of the codebook restriction to the wireless device 14. However, other techniques for communicating the codebook restriction to the wireless device 14 may be used. For instance, in an HSPA network, the base station 12 may communicate the codebook restriction to the wireless device 14 via a RNC, as discussed below.

Figure 12:
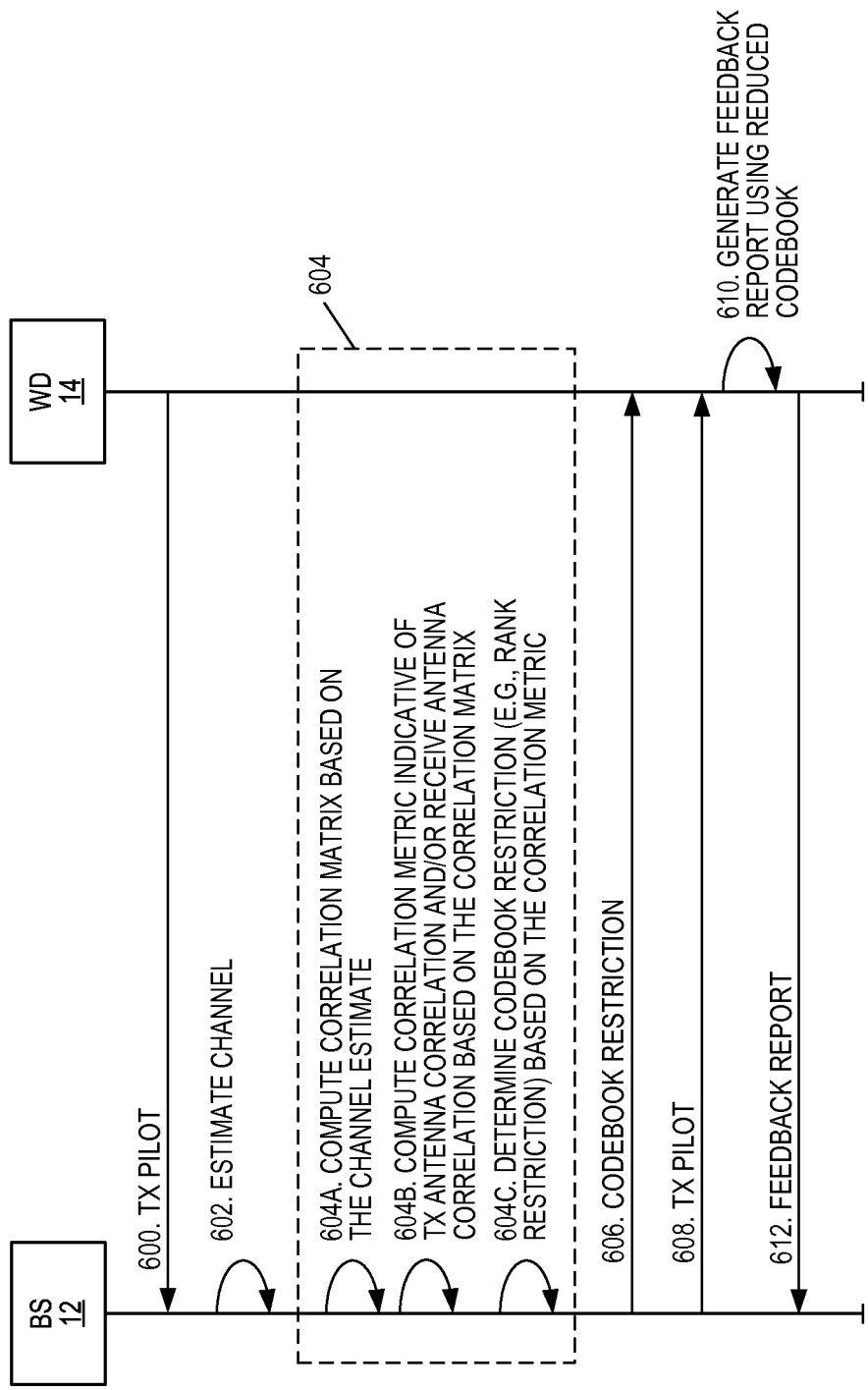
FIG. 12 illustrates the operation of the base station and the wireless device of FIG. 6 according to some embodiments of the present disclosure.

FIG. 12 illustrates the operation of the base station 12 and the wireless device 14 according to another embodiment of the present disclosure. This embodiment is similar to that of FIG. 11. As illustrated, the wireless device 14 transmits a pilot or reference signal (step 600). The base station 12 then estimates the MIMO channel from the wireless device 14 to the base station 12 using the pilot signal to thereby provide a channel estimate (step 602). Again, any suitable technique for estimating the MIMO channel may be used. The base station 12 then determines a codebook restriction for the wireless device 12 based on transmit antenna correlation and/or receive antenna correlation as computed based on the channel estimate (step 604). More specifically, in a manner similar to that described above with respect to step 204 of FIG. 8, the base station 12 computes a correlation matrix based on the channel estimate (step 604A). Then, the base station 12 computes a correlation metric indicative of the transmit antenna correlation and/or receive antenna correlation based on the correlation matrix (step 604B). Any of the embodiments described above for computing the correlation metric at the wireless device 14 may also be used to compute the correlation metric at the base station 12. The base station 12 then determines a codebook restriction (e.g., a rank restriction) based on the correlation metric (step 604C). Again, as discussed above, in some embodiments, multiple correlation zones and corresponding codebook restrictions are predefined. The base station 12 may then identify the correlation zone in which the correlation metric falls and select the corresponding codebook restriction as the desired codebook restriction. While in some embodiments the wireless device 14 can adapt the correlation zones depending on receiver implementation when the determination of the codebook restriction is performed by the wireless device 14, the network may be unaware of receiver details and, therefore, may use correlation zones for a general wireless device that is applicable to multiple wireless device types.

In this embodiment, the base station 12 transmits the codebook restriction (or more specifically an indication of the codebook restriction) to the wireless device 14 (step 606). While any suitable technique for transmitting the codebook restriction to the wireless device 14 may be used, in some embodiments, unused bit resources in one or more instances of a control channel may be used to transmit the codebook restriction. For example, two or more unused bit patterns in a Modulation (MOD) field in Part 1 of one or more instances of a Type 4 High Speed Shared Control Channel (HS-SCCH) may be used to transmit the codebook restriction. Each unused bit pattern (or combination of unused bit patterns across multiple instances of the HS-SCCH) is indicative of one or more different codebook restrictions. Note, however, that this is only an example. Other techniques (e.g., a bit map transmitted via, e.g., higher layer signaling such as Radio Resource Control (RRC) signaling) may be used to communicate the codebook restriction to the wireless device 14.

The base station 12 transmits a pilot or reference signal (step 608). Using the pilot signal, the wireless device 12 generates a feedback report using the reduced, or restricted, codebook as defined by the codebook restriction (step 610). More specifically, as described above, the wireless device 12 searches the reduced codebook (i.e., evaluates only those codebook elements included in the reduced codebook) for the best or preferred codebook element (e.g., PMI/RI) to be used for transmission from the base station 12 to the wireless device 14. The wireless device 14 then transmits the feedback report to the base station 12 (step 612). From that point, the base station 12 operates in the conventional manner (e.g., selects downlink parameter(s) using the reported codebook element from the wireless device 12 as, e.g., a recommendation).

Figure 13:
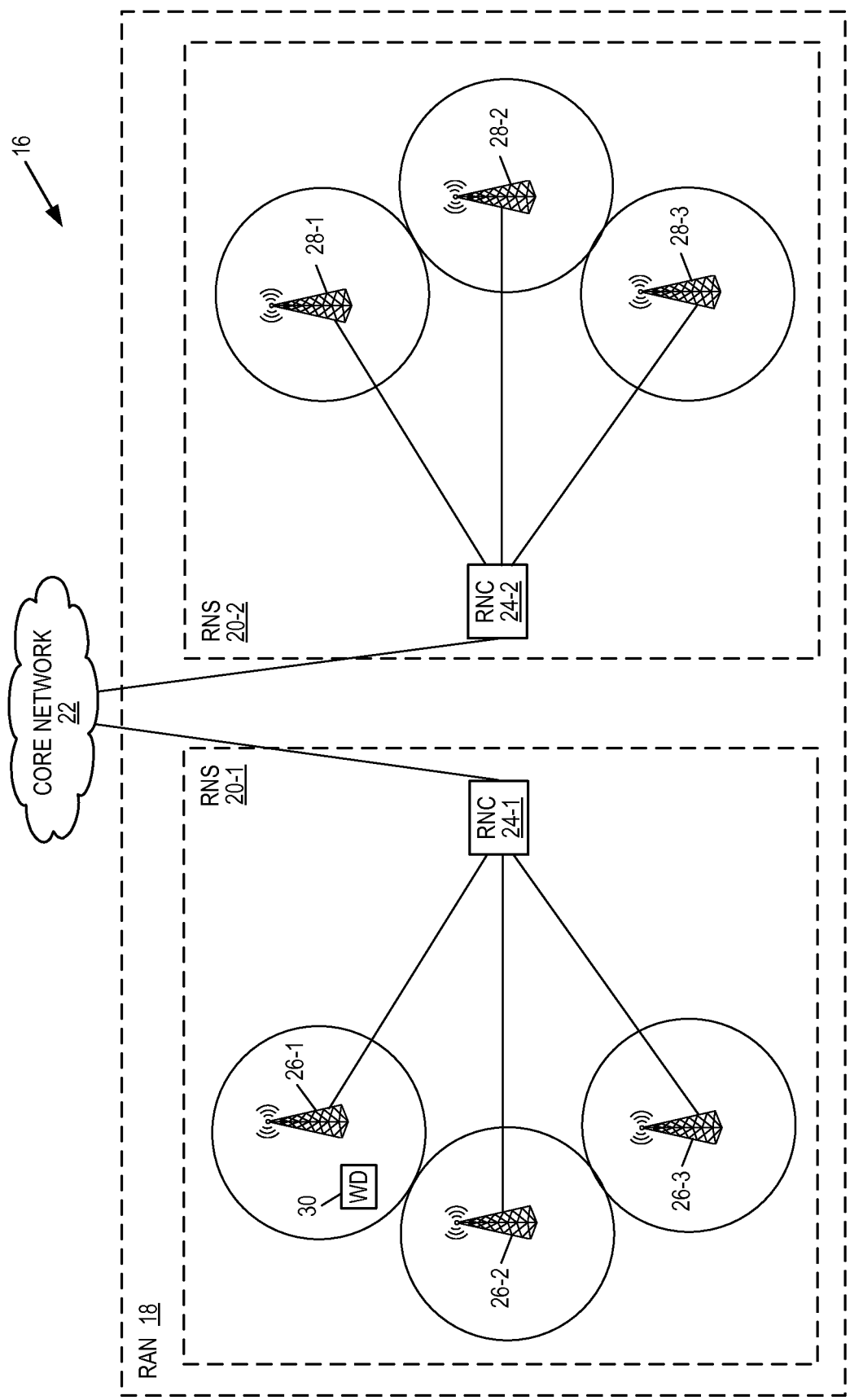
FIG. 13 illustrates a cellular communications network according to some additional embodiments of the present disclosure.

While the discussion above focuses on embodiments that utilize the network architecture of FIG. 6, the concepts disclosed herein can be used in any suitable network architecture. In this regard, FIG. 13 illustrates a cellular communications network 16 according to some additional embodiments of the present disclosure. In these embodiments, the cellular communications network 16 includes a Radio Access Network (RAN) 18 including a number of Radio Network Subsystems (RNSs) 20-1 and 20-2 (generally referred to herein collectively as RNSs 20 and individually as RNS 20). The RNS 20-1 includes a RNC 24-1 coupled to a core network 22 and base stations 26-1 through 26-3 (generally referred to herein as base stations 26 and individually as base station 26). In a similar manner, the RNS 20-2 includes a RNC 24-2 (the RNCs 24-1 and 24-2 are generally referred to herein collectively as RNCs 24 and individually as RNC 24) coupled to the core network 22 and base stations 28-1 through 28-3 (generally referred to herein collectively as base stations 28 and individually as base station 28). In one embodiment, the RAN 18 is a Universal Terrestrial Radio Access Network (UTRAN), in which case the base stations 26 and 28 are Node Bs. The base stations 26 and 28 provide cellular communications services to wireless devices, e.g., a wireless device 30.

In some embodiments, the wireless device 30 determines a codebook restriction and evaluates only the reduced codebook in the same manner described above with respect to the wireless device 14 of FIG. 6. In other embodiments, the base station 26 determines the codebook restriction for the wireless device 30 and communicates the codebook restriction to the wireless device 30 in a manner similar to that described above with respect to FIGS. 11 and 12. However, in the network architecture of FIG. 13, the base station 26 first sends the codebook restriction to the RNC 24, in some embodiments. The RNC 24 then sends the codebook restriction to the wireless device 30 using signaling, e.g., RRC signaling.

Figure 14:
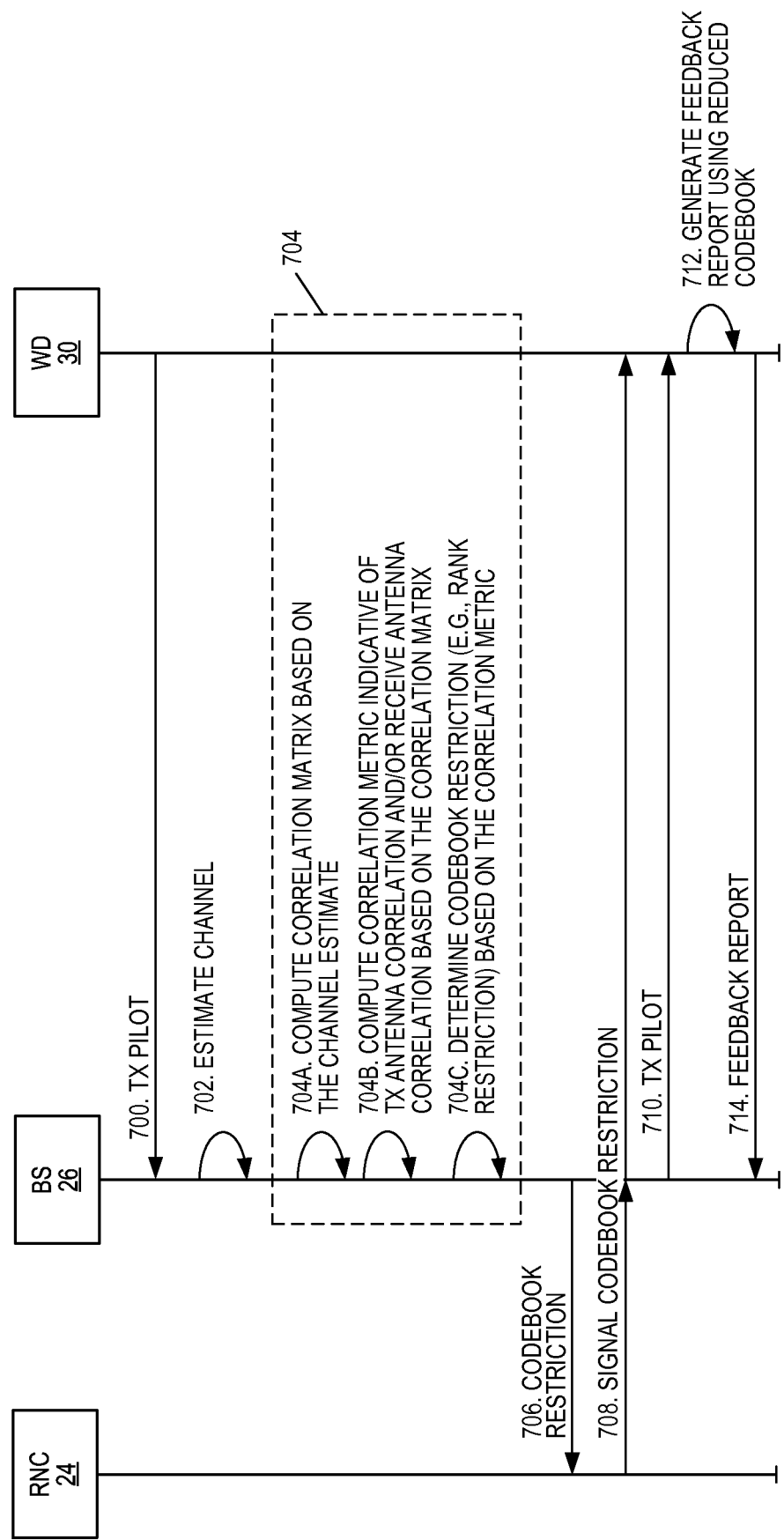
FIG. 14 illustrates the operation of the base station and the wireless device of FIG. 13 according to some embodiments of the present disclosure.

In this regard, FIG. 14 illustrates the operation of the base station 26 and the wireless device 30 of FIG. 13 according to some embodiments of the present disclosure. As illustrated, the wireless device 30 transmits a pilot or reference signal (step 700). The base station 26 then estimates the MIMO channel from the wireless device 30 to the base station 26 using the pilot signal to thereby provide a channel estimate (step 702). Again, any suitable technique for estimating the MIMO channel may be used. The base station 26 then determines a codebook restriction for the wireless device 30 based on transmit antenna correlation and/or receive antenna correlation as computed based on the channel estimate (step 704). More specifically, in a manner similar to that described above with respect to step 204 of FIG. 8, the base station 26 computes a correlation matrix based on the channel estimate (step 704A). Then, the base station 26 computes a correlation metric indicative of the transmit antenna correlation and/or receive antenna correlation based on the correlation matrix (step 704B). Any of the embodiments described above for computing the correlation metric at the wireless device 30 may also be used to compute the correlation metric at the base station 26. The base station 26 then determines a codebook restriction (e.g., a rank restriction) based on the correlation metric (step 704C). Again, as discussed above, in some embodiments, multiple correlation zones and corresponding codebook restrictions are predefined. The base station 26 may then identify the correlation zone in which the correlation metric falls and select the corresponding codebook restriction as the desired codebook restriction.

In this embodiment, the base station 26 transmits the codebook restriction (or more specifically an indication of the codebook restriction) to the RNC 24 (step 706). The RNC 24 then signals the codebook restriction to the wireless device 30 (step 708). This signaling may occur via the base station 26. In some embodiments, a bit pattern or bit map may be used to communicate the codebook restriction from the RNC 24 to the wireless device 30.

The base station 26 transmits a pilot or reference signal (step 710). Using the pilot signal, the wireless device 30 generates a feedback report using the reduced codebook as defined by the codebook restriction (step 712). More specifically, as described above, the wireless device 30 searches the restricted codebook (i.e., evaluates only those codebook elements included in the restricted codebook) for the best or preferred codebook element (e.g., PMI/RI) to be used for transmission from the base station 26 to the wireless device 30. The wireless device 30 then transmits the feedback report to the base station 26 (step 714). From that point, the base station 26 operates in the conventional manner (e.g., selects downlink parameter(s) using the reported codebook element from the wireless device 30 as, e.g., a recommendation).

Figure 15:
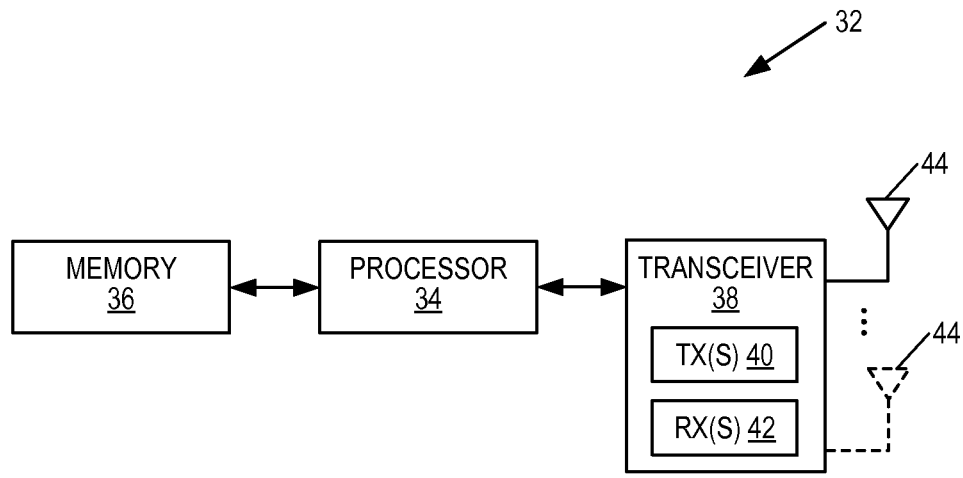
FIG. 15 is a block diagram of a wireless device according to some embodiments of the present disclosure.

FIG. 15 is a block diagram of a wireless device 32 according to some embodiments of the present disclosure. The wireless device 32 may, in some embodiments, be the wireless device 14 of FIG. 6 and, in other embodiments, the wireless device 30 of FIG. 13. As illustrated, the wireless device 32 includes at least one processor circuit 34 (e.g., Central Processing Unit(s) (CPU(s)), Application Specific Integrated Circuit(s) (ASIC(s)), Field Programmable Gate Array(s) (FPGA(s)), or the like), memory 36, and a transceiver 38 including one or more transmitters 40 and one or more receivers 42 coupled to at least one antenna 44. In some embodiments, there are more than one antenna 44 (e.g., four antennas for 4×4 MIMO). In some embodiments, the functionality of the wireless device 14 or 30 is implemented in software and stored in the memory 36. This software is executable by the processor circuit(s) 34, whereby the wireless device 32 operates according to any of the embodiments described herein.

In some embodiments, a computer program including instructions which, when executed by at least one processor circuit, causes the at least one processor circuit to carry out the functionality of the wireless device 14 or 30 according to any of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 36).

Figure 16:
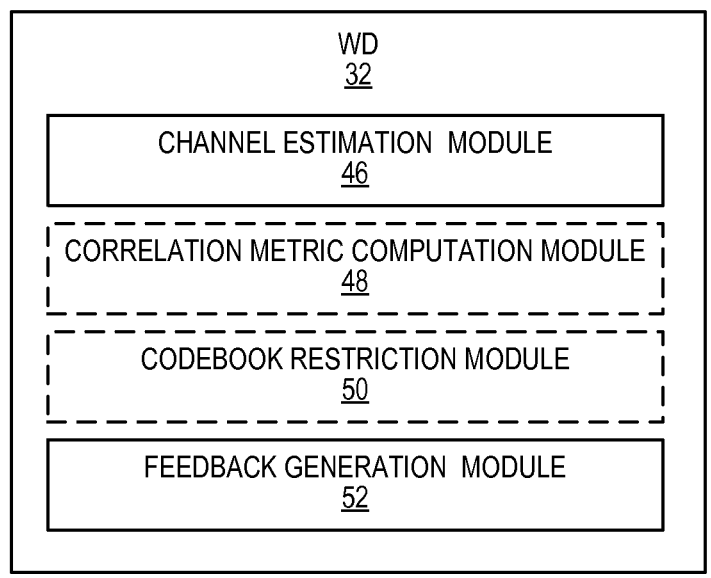
FIG. 16 is a block diagram of a wireless device according to other embodiments of the present disclosure.

FIG. 16 is a block diagram of the wireless device 32 according to other embodiments of the present disclosure. As illustrated, the wireless device 32 includes a channel estimation module 46, a correlation metric computation module 48 (in some embodiments), a codebook restriction module 50 (in some embodiments), and a feedback generation module 52, each of which is implemented in software. The channel estimation module 46 operates to estimate the MIMO channel between, e.g., the base station 12, 26 and the wireless device 32 using any suitable MIMO channel estimation technique, as described above. In the embodiments where the wireless device 32 determines the codebook restriction, the correlation metric computation module 48 computes a correlation metric that is indicative of antenna correlation (i.e., transmit antenna correlation and/or receive antenna correlation) based on the channel estimate, and the codebook restriction module 50 determines the codebook restriction based on the correlation metric, as described above. The feedback generation module 52 operates to generate a feedback report using the reduced codebook, as described above, whether the codebook restriction was determined by the wireless device 32 or communicated to the wireless device 32 from the network.

Figure 17:
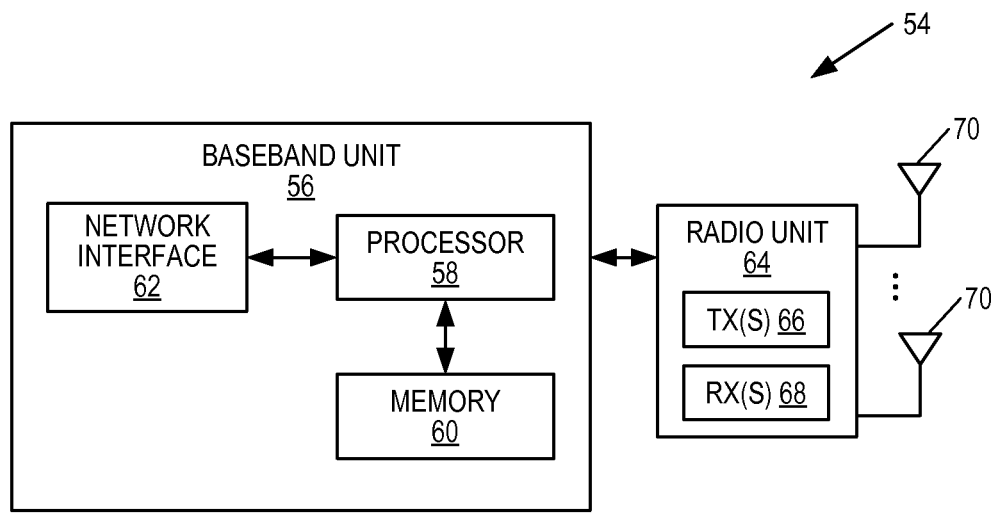
FIG. 17 is a block diagram of a network node, e.g., a base station, according to some embodiments of the present disclosure.

FIG. 17 is a block diagram of a base station 54 according to some embodiments of the present disclosure. The base station 54 may, in some embodiments, be the base station 12 of FIG. 6 and, in other embodiments, the base station 26 of FIG. 13. As illustrated, the base station 54 includes a baseband unit 56 including at least one processor circuit 58 (e.g., CPU(s), ASIC(s), FPGA(s), or the like), memory 60, and an network interface 62 as well as a radio unit 64 including one or more transmitters 66 and one or more receivers 68 coupled to multiple antennas 70. In some embodiments, the functionality of the base station 12, 26 is implemented in software and stored in the memory 60. This software is executable by the processor circuit(s) 58, whereby the base station 54 operates according to any of the embodiments described herein.

In some embodiments, a computer program including instructions which, when executed by at least one processor circuit, causes the at least one processor circuit to carry out the functionality of the base station 12, 26 according to any of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 60).

Figure 18:
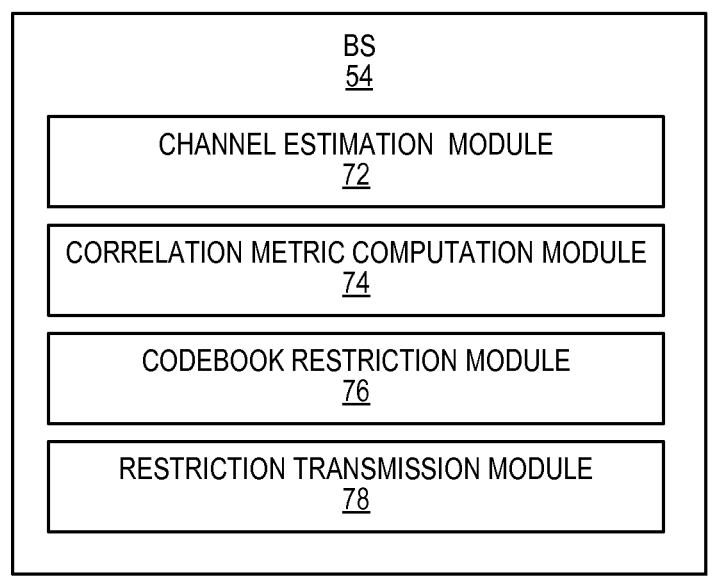
FIG. 18 is a block diagram of a network node, e.g., a base station, according to other embodiments of the present disclosure.

FIG. 18 is a block diagram of the base station 54 according to other embodiments of the present disclosure. In this embodiment, the base station 54, rather than the wireless device 14, 30, operates to determine the codebook restriction. As such, the base station 54 includes a channel estimation module 72, a correlation metric computation module 74, a codebook restriction module 76, and a restriction transmission module 78, each of which is implemented in software. The channel estimation module 72 operates to estimate the MIMO channel between, e.g., the base station 54 and the wireless device 14, 30 using any suitable MIMO channel estimation technique, as described above. The correlation metric computation module 74 computes a correlation metric that is indicative of antenna correlation (i.e., transmit antenna correlation and/or receive antenna correlation) based on the channel estimate, and the codebook restriction module 76 determines the codebook restriction based on the correlation metric, as described above. The restriction transmission module 78 operates to communicate the codebook restriction to the wireless device 14, 30 either directly or indirectly, as described above.

Systems and methods are disclosed herein that restrict the codebook that is evaluated in the search for the best or preferred codebook element in a closed-loop codebook-based precoding system based on antenna correlation. By restricting the codebook, the size of the search space is reduced, which in turn reduces the computational complexity of the search. While not being limited to or by any particular advantage, some examples are as follows. In some implementations, the percentage degradation with respect to the full, or exhaustive, search is almost zero, while the complexity can be reduced. For example, for the three correlation zone example, the number of ranks evaluated may be reduced from three to one, which in turn reduces computational complexity by a factor of three. As another example, in some implementations, the wireless device 14, 30 is a mobile device, and the codebook restriction may reduce the power consumption of the wireless device 14, 30 by, e.g., reducing the hardware resources (e.g., memory and processing resources) needed for the search. The reduction of resources for the search may also allow additional resources to be used for other procedures (e.g., inter-RAT measurements) in parallel Channel State Information (CSI) estimation.

The following acronyms are used throughout this disclosure.

3GPP 3$^{rd}$ Generation Partnership Project
AP Access Point
ASIC Application Specific Integrated Unit
BSC Base Station Controller
BTS Base Transceiver Station
CA Carrier Aggregation
CPU Central Processing Unit
CQI Channel Quality Indicator
CSI Channel State Information
D2D Device-to-Device
DAS Distributed Antenna System
DFT Discrete Fourier Transform
eNB Enhanced or Evolved Node B
E-UTRA Evolved Universal Terrestrial Radio Access
FDD Frequency Division Duplexing
FPGA Field Programmable Gate Array
GERAN Global System for Mobile Communications Enhanced Data Rates for Global System for Mobile Communications Evolution Radio Access Network
GSM Global System for Mobile Communications
HSDPA High Speed Downlink Packet Access
HSPA High Speed Packet Access
HS-SCCH High Speed Shared Control Channel
LEE Laptop Embedded Equipment
LME Laptop Mounted Equipment
LTE Long Term Evolution
M2M Machine-to-Machine
MC Multi Carrier
MIMO Multiple-Input-Multiple-Output
ML Maximum-Likelihood
MLD Maximum Likelihood Detector
MMSE Minimum Mean Square Error
MOD Modulation
MSR Multi-Standard Radio
NB Node B
OFDM Orthogonal Frequency Division Multiplexing
PCI Precoding Indicator
PDA Personal Digital Assistant
PDCCH Physical Downlink Control Channel
PDSCH Physical Downlink Shared Channel
PMI Precoding Matrix Indicator
PUSCH Physical Uplink Shared Channel
RAN Radio Access Network
RAT Radio Access Technology
RI Rank Indicator
RNC Radio Network Controller
RNS Radio Network Subsystem
RRC Radio Resource Control
RRH Remote Radio Head
RRU Remote Radio Unit
RSRP Reference Signal Received Power
SINR Signal to Interference plus Noise Ratio
SM Spatial Multiplexing
SNR Signal to Noise Ratio
TDD Time Division Duplexing
TS Technical Specification
TTI Transmit Time Interval
UE User Equipment
USB Universal Serial Bus
UTRA Universal Terrestrial Radio Access
UTRAN Universal Terrestrial Radio Access Network
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device to provide feedback for a closed-loop codebook-based precoding system, comprising:
   determining, by the wireless device, a codebook restriction for the closed-loop codebook-based precoding system based on an antenna correlation for a Multiple-Input-Multiple-Output, MIMO, channel between a network node and the wireless device, the antenna correlation being at least one of transmit antenna correlation and receive antenna correlation and the codebook restriction being a restriction that reduces a search space of a full codebook for the closed-loop codebook-based precoding system of the wireless device to a reduced codebook where the search space reduction increases as the antenna correlation increases;
   searching, by the wireless device, the reduced codebook for a preferred codebook element for closed-loop codebook-based precoding;
   generating, by the wireless device, a feedback report using the preferred codebook element of the reduced codebook for the closed-loop codebook-based precoding system; and
   transmitting, by the wireless device, the feedback report to the network node;
   where the full codebook prior to the codebook restriction comprises a plurality of precoding matrices for each of a plurality of ranks, and the codebook restriction is a restriction on the plurality of ranks.

2. The method of claim 1 further comprising:
   estimating, by the wireless device, the MIMO channel between the network node and the wireless device to provide a channel estimate;
   wherein determining the codebook restriction based on the antenna correlation comprises:
   computing, by the wireless device, a correlation matrix for the MIMO channel based on the channel estimate;
   computing, by the wireless device, a correlation metric indicative of the antenna correlation based on the correlation matrix; and
   determining, by the wireless device, the codebook restriction for the closed-loop codebook-based precoding system based on the correlation metric.

3. The method of claim 1 wherein generating the feedback report using the reduced codebook comprises:
   computing, by the wireless device, a capacity of the MIMO channel for each element in the reduced codebook; and
   selecting, by the wireless device, the element in the reduced codebook having a maximum capacity from among the elements in the reduced codebook as a select element to be included in the feedback report.

4. The method of claim 1 wherein the antenna correlation is the transmit antenna correlation and the receive antenna correlation.

5. The method of claim 1 wherein the antenna correlation is the transmit antenna correlation.

6. The method of claim 1 wherein the antenna correlation is the receive antenna correlation.

7. The method of claim 1 wherein determining the codebook restriction based on the antenna correlation comprises:
selecting, by the wireless device, a first codebook restriction as the codebook restriction if a correlation metric representative of the antenna correlation is in a first range; and
selecting, by the wireless device, a second codebook restriction as the codebook restriction if the correlation metric representative of the antenna correlation is in a second range.

8. The method of claim 1 wherein the network node is a radio access node in a cellular communications network.

9. The method of claim 2 wherein determining the codebook restriction based on the correlation metric comprises:
identifying, by the wireless device, a correlation zone for the correlation metric, the correlation zone being one of a plurality of predefined correlation zones each corresponding to a different range of correlation metric values and having a different predefined codebook restriction; and
selecting, by the wireless device, the predefined codebook restriction of the correlation zone identified for the correlation metric as the codebook restriction.

10. The method of claim 8 wherein the cellular communications network is a Long Term Evolution, LTE, network.

11. The method of claim 8 wherein the cellular communications network is a High Speed Packet Access, HSPA, network.

12. A wireless device enabled to provide feedback for a closed-loop codebook based precoding system, comprising:
a transceiver comprising a transmitter and a receiver;
at least one processor circuit; and
memory containing software instructions executable by the at least one processor circuit whereby the wireless device is operative to:
determine, by the wireless device, a codebook restriction for the closed-loop codebook-based precoding system based on an antenna correlation for a Multiple-Input-Multiple-Output, MIMO, channel between a network node and the wireless device, the antenna correlation being at least one of transmit antenna correlation and receive antenna correlation and the codebook restriction being a restriction that reduces a search space of a full codebook for the closed-loop codebook-based precoding system of the wireless device to a reduced codebook where the search space reduction increases as the antenna correlation increases;
search, by the wireless device, the reduced codebook for a preferred codebook element for closed-loop codebook-based precoding;
generate, by the wireless device, a feedback report using the preferred codebook element of the reduced codebook for the closed-loop codebook-based precoding system; and
transmit, by the wireless device, the feedback report to the network node via the transmitter;
where the full codebook prior to the codebook restriction comprises a plurality of precoding matrices for each of a plurality of ranks, and the codebook restriction is a restriction on the plurality of ranks.

13. The wireless device of claim 12 where the wireless device is further operative to:
estimate, by the wireless device, the MIMO channel between the network node and the wireless device to provide a channel estimate; and
in order to determine the codebook restriction based on the antenna correlation, the wireless device is further operative to:
compute, by the wireless device, a correlation matrix for the MIMO channel based on the channel estimate;
compute, by the wireless device, a correlation metric indicative of the antenna correlation based on the correlation matrix; and
determine, by the wireless device, the codebook restriction for the closed-loop codebook-based precoding system based on the correlation metric.

14. The wireless device of claim 12 wherein the antenna correlation is the transmit antenna correlation and the receive antenna correlation.

15. The wireless device of claim 12 wherein the antenna correlation is the transmit antenna correlation.

16. The wireless device of claim 12 wherein the antenna correlation is the receive antenna correlation.

17. The wireless device of claim 12 wherein the network node is a radio access node in a cellular communications network.

18. A method of operation of a network node to provide a codebook restriction for a closed-loop codebook-based precoding system, comprising:
determining, by the network node, a codebook restriction for the closed-loop codebook-based precoding system based on an antenna correlation for a Multiple-Input-Multiple-Output, MIMO, channel between the network node and a wireless device, the antenna correlation being at least one of transmit antenna correlation and receive antenna correlation and the codebook restriction being a restriction that reduces a search space of a full codebook for the closed-loop codebook-based precoding system of the wireless device to a reduced codebook where the search space reduction increases as the antenna correlation increases; and
communicating, by the network node, the codebook restriction for the closed-loop codebook-based precoding system to the wireless device;
where the full codebook prior to the codebook restriction comprises a plurality of precoding matrices for each of a plurality of ranks, and the codebook restriction is a restriction on the plurality of ranks.

19. The method of claim 18 further comprising:
estimating, by the network node, the MIMO channel to provide a channel estimate;
wherein determining the codebook restriction based on the antenna correlation comprises:
computing, by the network node, a correlation matrix for the MIMO channel based on the channel estimate;
computing, by the network node, a correlation metric indicative of the antenna correlation based on the correlation matrix; and
determining, by the network node, the codebook restriction based on the correlation metric.

20. The method of claim 18 wherein determining the codebook restriction based on the correlation metric comprises:
identifying, by the network node, a correlation zone for the correlation metric, the correlation zone being one of a plurality of predefined correlation zones each corresponding to a different range of correlation metric values and having a different predefined codebook restriction; and selecting, by the network node, the predefined codebook restriction of the correlation zone identified for the correlation metric as the codebook restriction.

21. The method of claim 18 wherein the antenna correlation is the transmit antenna correlation and the receive antenna correlation.

22. The method of claim 18 wherein the antenna correlation is the transmit antenna correlation.

23. The method of claim 18 wherein the antenna correlation is the receive antenna correlation.

24. The method of claim 18 wherein determining the codebook restriction based on the antenna correlation comprises:

selecting, by the network node, a first codebook restriction as the codebook restriction if a correlation metric representative of the antenna correlation is in a first range; and selecting, by the network node, a second codebook restriction as the codebook restriction if the correlation metric representative of the antenna correlation is in a second range.

25. The method of claim 18 wherein communicating the codebook restriction to the wireless device comprises transmitting the codebook restriction to the wireless device.

26. The method of claim 18 wherein communicating the codebook restriction to the wireless device comprises sending the codebook restriction to a radio network controller responsible for signaling the codebook restriction to the wireless device.

27. The method of claim 18 wherein the network node is a radio access node in a cellular communications network.

28. The method of claim 27 wherein the cellular communications network is a Long Term Evolution, LTE, network.

29. The method of claim 27 wherein the cellular communications network is a High Speed Packet Access, HSPA, network.

30. A network node enabled to restrict a codebook search space of a wireless device for a closed-loop codebook-based precoding system, comprising:

a radio unit comprising a transmitter and a receiver;
at least one processor circuit; and
memory containing software instructions executable by the at least one processor circuit whereby the network node is operative to:

determine, by the network node, a codebook restriction for the closed-loop codebook-based precoding system based on an antenna correlation for a Multiple-Input-Multiple-Output, MIMO, channel between the network node and the wireless device, the antenna correlation being at least one of transmit antenna correlation and receive antenna correlation and the codebook restriction being a restriction that reduces a search space of a full codebook for the closed-loop codebook-based precoding system of the wireless device to a reduced codebook where the search space reduction increases as the antenna correlation increases; and communicate, by the network node, the codebook restriction for the closed-loop codebook-based precoding system to the wireless device;

where the full codebook prior to the codebook restriction comprises a plurality of precoding matrices for each of a plurality of ranks, and the codebook restriction is a restriction on the plurality of ranks.

31. The network node of claim 30 wherein the network node is further operative to:

estimate, by the network node, the MIMO channel to provide a channel estimate;

wherein, in order to determine the codebook restriction based on the antenna correlation, the network node is further operative to:

compute, by the network node, a correlation matrix for the MIMO channel based on the channel estimate;

compute, by the network node, a correlation metric indicative of the antenna correlation based on the correlation matrix; and determine, by the network node, the codebook restriction based on the correlation metric.

32. The network node of claim 30 wherein the antenna correlation is the transmit antenna correlation and the receive antenna correlation.

33. The network node of claim 30 wherein the antenna correlation is the transmit antenna correlation.

34. The network node of claim 30 wherein the antenna correlation is the receive antenna correlation.

35. The network node of claim 30 wherein, in order to communicate the codebook restriction to the wireless device, the network node is further operative to transmit the codebook restriction to the wireless device.

36. The network node of claim 30 wherein, in order to communicate the codebook restriction to the wireless device, the network node is further operative to send the codebook restriction to a radio network controller responsible for signaling the codebook restriction to the wireless device.

37. The network node of claim 30 wherein the network node is a radio access node in a cellular communications network.

* * * * *